(12) United States Patent
Zych et al.

(10) Patent No.: US 10,689,570 B2
(45) Date of Patent: *Jun. 23, 2020

(54) SILICATE PHOSPHORS

(71) Applicant: Merck Patent GmbH, Darmstadt (DE)

(72) Inventors: Aleksander Zych, Darmstadt (DE);
Ralf Petry, Griesheim (DE); Mathias Rapphahn, Greifswald (DE); Ingo Koehler, Darmstadt (DE); Stefan Tews, Greifswald (DE)

(73) Assignee: Merck Patent GmbH, Darmstadt (DE)

( * ) Notice: Subject to any disclaimer, the term of this patent is extended or adjusted under 35 U.S.C. 154(b) by 294 days.

This patent is subject to a terminal disclaimer.

(21) Appl. No.: 15/569,438

(22) PCT Filed: Mar. 30, 2016

(86) PCT No.: PCT/EP2016/000532
§ 371 (c)(1),
(2) Date: Oct. 26, 2017

(87) PCT Pub. No.: WO2016/173691
PCT Pub. Date: Nov. 3, 2016

(65) Prior Publication Data
US 2018/0298280 A1    Oct. 18, 2018

(30) Foreign Application Priority Data

Apr. 27, 2015   (EP) .................................. 15001235

(51) Int. Cl.
*C09K 11/77*   (2006.01)
*C09K 11/02*   (2006.01)
(Continued)

(52) U.S. Cl.
CPC ........ *C09K 11/7734* (2013.01); *C01B 21/082* (2013.01); *C01B 33/24* (2013.01);
(Continued)

(58) Field of Classification Search
CPC .............. C09K 11/7734; C09K 11/025; C09K 11/7792
See application file for complete search history.

(56) References Cited

U.S. PATENT DOCUMENTS 3,651,363 A  *  3/1972  Barry ................. C09K 11/7734
                                                              313/486
6,613,383 B1     9/2003  George et al.
(Continued)

FOREIGN PATENT DOCUMENTS

CN       101360803 A     2/2009
CN       101855316 A    10/2010
(Continued)

OTHER PUBLICATIONS

International Search Report PCT/EP2016/000532 dated Jun. 28, 2016.
(Continued)

*Primary Examiner* — C Melissa Koslow
(74) *Attorney, Agent, or Firm* — Millen White Zelano & Branigan, PC; Brion P. Heaney

(57) ABSTRACT

The invention relates to pyrosilicate phosphors comprising a coating of aluminum oxide, to a process for the preparation of these compounds, and to the use thereof as conversion phosphors or in lamps.

20 Claims, 8 Drawing Sheets

(51) Int. Cl.
*C01B 21/082* (2006.01)
*C01B 33/24* (2006.01)
*C01B 33/26* (2006.01)

(52) U.S. Cl.
CPC ............ *C01B 33/26* (2013.01); *C09K 11/025* (2013.01); *C09K 11/7792* (2013.01)

(56) References Cited

U.S. PATENT DOCUMENTS

| | | | |
|---|---|---|---|
| 6,713,177 | B2 | 3/2004 | George et al. |
| 6,913,827 | B2 | 7/2005 | George et al. |
| 7,276,183 | B2 * | 10/2007 | Tian .................. C09K 11/7731 252/301.4 F |
| 7,514,020 | B2 * | 4/2009 | Zeng .................. C09K 11/7738 252/301.4 F |
| 7,724,321 | B2 * | 5/2010 | Hsieh ................ G02B 27/0927 349/106 |
| 7,833,437 | B2 | 11/2010 | Fan et al. |
| 8,519,609 | B2 | 8/2013 | Winkler et al. |
| 8,801,968 | B2 | 8/2014 | Petry et al. |
| 10,125,315 | B2 * | 11/2018 | Zych .................. C09K 11/7734 |
| 2012/0199793 | A1 * | 8/2012 | Weimer ............... C09K 11/025 252/301.4 R |
| 2012/0300155 | A1 | 11/2012 | Winkler |
| 2013/0094186 | A1 * | 4/2013 | Sun ...................... C09K 11/025 362/97.3 |

FOREIGN PATENT DOCUMENTS

| | | |
|---|---|---|
| CN | 101874094 A | 10/2010 |
| CN | 103450876 A | 12/2013 |
| CN | 103668119 B | 6/2016 |
| EP | 2528991 B1 | 11/2014 |
| JP | 2007154122 A | 6/2007 |
| JP | 2009013319 | 1/2009 |
| JP | 2014060283 A | 4/2014 |
| KR | 20080056818 A | 6/2008 |
| KR | 2010002649 A | 1/2010 |
| WO | 07087480 A2 | 8/2007 |
| WO | 15062697 A1 | 5/2015 |
| WO | 2016173691 A1 | 11/2016 |

OTHER PUBLICATIONS

Shen C et al: "Synthesis and luminous characteristics of $Ba_2MgSi_{2x}Al_xO_7$: $0.1Eu^{2+}$, $0.1Mn^{2+}$ phosphor for WLED", Optik, Wissenschaftliche Verlag GMBH, DE, vol. 121, No. 1, Jan. 1, 2010 (Jan. 1, 2010), pp. 29-32, XP026789819, ISSN: 0030-4026.
Jong-Min Kim et al: "The luminescence properties of MMgSiO:Eu(M= Sr, Ba) nano phosphor in ultraviolet light emitting diodes", Ceramics International, vol. 38, May 27, 2011 (May 27, 2011), pp. S571-S575, XP028347048, ISSN: 0272-8842.
T.T.H. Tam et al: "Co-precipitation synthesis and optical properties of green-emitting $Ba_2MgSi_2O_7$:$Eu^{2+}$ phosphor", Journal of Luminescence, vol. 147, Mar. 1, 2014 (Mar. 1, 2014), NL, pp. 358-362, XP055281325, ISSN: 0022-2313.
George, Steven:, Chem. Rev. Atomic Layer Deposition: An Overview, 2010, 110 111-131.
Notification of Reasons for Refusal (1st Office Action) in corresponding JPAppln. No. 2017-556247 dated Jan. 6, 2020 (pp. 1-5).
Xinguo Zhang et al., Photo-Physical Behaviors of Efficient Green Phosphor $Ba_2MgSi_2O_7$:$Eu^{2+}$ and Its Application in Light-Emitting Diodes, J. Am. Ceram. Soc., vol. 93, No. 5, p. 1368-1371 (2010).
Notification of the First Office Action in corresponding CN patent application 201680024303.4 dated Mar. 30, 2020 (pp. 1-7)-English.

\* cited by examiner a)

b)

a)

b)

a)

b)

a)

b)

SILICATE PHOSPHORS

The invention relates to europium-doped silicate phosphors comprising a coating of aluminum oxide, to a process for the preparation of these phosphors, and to the use thereof as conversion phosphors or in lamps.

Inorganic fluorescent powders which can be excited in the blue, violet and/or UV region of the spectrum are important for use as phosphors for phosphor-converted LEDs, pc-LEDs for short. Many phosphor material systems for pc-LEDs have been disclosed, for example alkaline-earth metal ortho-silicates, alkaline-earth metal oxy-ortho-silicates, alkaline-earth metal pyrosilicates, thiogallates, garnets and nitrides, each of which are doped with $Ce^{3+}$ or $Eu^{2+}$.

Silicate compounds have been employed as conversion phosphor in pc-LEDs. With these very efficient phosphors an emission wavelength range from 430 to 650 nm is accessible by variation of the composition. Silicate based phosphors, such as ortho-silicates ($AE_2SiO_4:Eu^{2+}$ with AE=earth alkaline of the group Ca, Sr, Ba or $AE_3MgSi_2O_8:Eu^{2+}$), oxy-ortho-silicates ($AE_3SiO_5:Eu^{2+}$) and pyrosilicates ($AE_2MgSi_2O_7:Eu^{2+}$) are important down converters for LEDs and other lighting sources. These materials can be excited by (near-) UV, violet and blue to greenish light and convert the pumping light into emission ranging from blue to orange (ortho-silicates), yellow-orange to deep orange-red (oxy-ortho-silicates) or green (pyrosilicates).

However, a disadvantage of these materials is their sensitivity to moisture, and some of these materials show poor stability in the lighting device, if operated at high temperature and high humidity. In particular, compounds having a high barium content in the crystal lattice gradually hydrolyze on contact with water. This results in destruction of the crystal lattice, causing the phosphor drastically to lose intensity.

Furthermore, not only does the intensity decrease, but one can also observe a change in emission color over time for these materials, especially when driven at high humidity and temperature. However, for use in white LEDs, it is important that the emission color of the phosphors remains unchanged over time. Otherwise, the LED changes its color point within the lifetime of the LED, which is a highly undesired effect.

Thus, it is desirable to find a solution in order to overcome the challenge of stability, also often referred as reliability, and to improve the reliability of these materials.

One way to do so, is to coat the surface of the phosphor particles. Reasons for doing this include particle protection, often against reaction with water, but also against reaction with air, other oxidants, or contaminants. Among the coating materials used for these purposes are ZnO, MgO, $In_2O_3$, $Al_2O_3$, $TiO_2$ and $SiO_2$.

Chemical vapor deposition (CVD) and sol-gel methods have been used to provide coatings of these types. To be effective, the applied coating should be as uniform as possible. It is also beneficial that the coating process does not cause individual particles to agglomerate to form larger aggregates. In addition to having much larger diameters than are wanted, these aggregates often tend to break apart, revealing defects in the coating at the break areas. The underlying particles are subject to attack from water, oxidants and other materials at the places where these defects occur. Neither CVD nor sol-gel techniques are entirely satisfactory, as agglomerates tend to form readily in these processes. In addition, these methods require relatively large amounts of raw materials, as only a portion of the applied reactants actually become applied to the surface of the phosphor particles. Quite often, material applied by these processes form separate particles instead of forming films on the surface of the phosphor particles. KR 2010-0002649 describes various silicate phosphors, which are coated with a metal oxide, in particular with SnO, $TiO_2$ or $SiO_2$, via a wet-chemical process. KR 2008-0056818 describes phosphors, in particular thiogallate phosphors, which are coated with $Al_2O_3$ via a wet-chemical process. KR 2008-0062619 describes a coating process for a number of phosphors, including silicate phosphors, by means of a precipitation process. There are still further improvements desired with respect to homogeneity of the coating as well as reliability of the phosphor material.

The object of the present invention is to develop alkaline-earth metal pyrosilicate phosphors with improved stability of the emission intensity to moisture and at the same time with improved stability of the color point of emission over time. A further object of the present invention is to provide a process for the preparation of these improved alkaline-earth metal pyrosilicate phosphors. In addition, an object of the invention also is to provide a mixture of the said alkaline-earth metal pyrosilicate phosphor with further phosphors. In addition, a further object of the invention consists in indicating various uses of these phosphors.

Surprisingly, it has now been found that europium-doped alkaline-earth metal pyrosilicate phosphors, which comprise a coating comprising aluminum oxide which is applied via a so-called atomic layer deposition (ALD) process solve the above-mentioned problem and show improved stability to moisture with respect to emission intensity as well as improved color stability. This is a surprising effect, as the state of the art does not show any effect in particular on the stability of the color point of emission. In this process, layers comprising alumina are grown at the surfaces of the silicate powders. The production process has considerable influence on the performance of the phosphor, and a phosphor coated by a wet-chemical process or a chemical vapor deposition according to the state of the art as described above is different to a phosphor according to the invention.

Atomic layer deposition is an ultra-thin film deposition process, which has been described in detail in publications such as George, Chem. Rev. 2010, 110, 111-131. This gas phase process has been used to perform coatings on materials from highly patterned wafers such as semiconductor devices to ultra-fine powders and nanomaterials. The coating of fine powders by this technique has been described in detail by King et al. (Powder Technology 221 (2012) 13-25) and is furthermore described in U.S. Pat. Nos. 6,613,383, 6,713,177 and 6,913,827.

The present invention therefore relates to a compound of the formula (1),

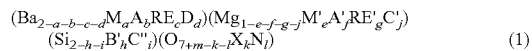

(1)

where the following applies to the symbols and indices used:

M is selected from the group consisting of Ca, Sr, Zn or mixtures of these elements;

A is selected from the group consisting of Na, K, Rb or mixtures of these elements;

RE is selected from the group consisting of La, Y, Gd or mixtures of these elements;

D is selected from the group consisting of $Eu^{2+}$, $Mn^{2+}$, $Yb^{2+}$, $Sm^{2+}$ or mixtures of these elements;

M' is selected from the group consisting of Zr, Hf or mixtures of these elements;

A' is selected from the group consisting of Li, Na or mixtures of these elements;

RE' is selected from the group consisting of Sc, Lu or mixtures of these elements;

C' is selected from the group consisting of B, Al, Ga, In or mixtures of these elements;

B' is selected from the group consisting of Ge, Sn or mixtures of these elements;

C" is selected from the group consisting of B, Al, Ga, In or mixtures of these elements;

X is selected from the group consisting of F, Cl or mixtures of these elements;

N is nitrogen;

$0 \leq a \leq 1.0$;
$0 \leq b \leq 0.6$;
$0 \leq c \leq 0.6$;
$0 < d \leq 2$;
$0 \leq e \leq 0.3$;
$0 \leq f \leq 0.3$;
$0 \leq g \leq 0.3$;
$0 \leq j \leq 0.6$;
$\leq h \leq 1.0$;
$0 \leq i \leq 0.6$;
$0 \leq k \leq 2.1$;
$0 \leq l \leq 2.1$;
$-2.0 \leq m \leq 2.0$;

characterized in that the compound contains a coating of aluminum oxide (alumina) which has been deposited by an ALD process.

It is understood that the compound of formula (1) as well as the preferred embodiments is charge-neutral, i.e. the positive charges of the cationic elements of the lattice and the negative charges of the anionic elements of the lattice compensate each other.

Several charge compensation schemes are possible for the inventive compounds, such as intentional charge compensation via incorporation of several host-modifying co-dopants or host-self-compensation via e.g. oxygen vacancies ($V_O$) or interstitial oxygen atoms ($O_i$) in the lattice. The index m in formula (1), which can be a positive or a negative value, accounts for oxygen vacancies or interstitial oxygen atoms in the lattice.

When a monovalent cation is incorporated on a divalent site, this is followed by a simultaneous incorporation of a trivalent cation on the same site or the other divalent site or the tetravalent site in equivalent amount. For example, the incorporation of an alkaline metal A or A' can be compensated by the incorporation of an equivalent amount of a trivalent cation, such as aluminum. Alternatively a simultaneous incorporation of a halide anion can be done in an equivalent amount. Another possibility is the utilisation of host lattice self-compensation by having an oxygen anion vacancy.

When a trivalent cation is incorporated on a divalent site, this is followed by a simultaneous incorporation of another trivalent cation on the tetravalent site in equivalent amount. Another possibility is the use a trivalent nitride anion on a divalent oxygen site in an equivalent amount. Another possibility is the utilization of host lattice self-compensation by having an extra interstitial oxygen anion.

When a tetravalent cation is incorporated on a divalent site, this is followed by a simultaneous incorporation of a trivalent cation on a tetravalent site and additionally a nitride anion on an oxygen site and the simultaneous incorporation of interstitial oxygen atoms.

In a preferred embodiment of the invention, the following applies for the index a: $0 \leq a \leq 0.6$, more preferably $0 \leq a \leq 0.4$.

In a further preferred embodiment of the invention, the following applies for the index b: $0 \leq b \leq 0.4$, more preferably $0 \leq b \leq 0.2$.

In a further preferred embodiment of the invention, the following applies for the index c: $0 \leq c \leq 0.4$, more preferably $0 \leq c \leq 0.2$.

In a further preferred embodiment of the invention, the following applies for the index d: $0 < d \leq 1.0$, more preferably $0.001 \leq d \leq 0.4$, even more preferably $0.005 \leq d \leq 0.2$, most preferably 0.01.

In a further preferred embodiment of the invention, the following applies for the index e: $0 \leq e \leq 0.2$, more preferably $0 \leq e \leq 0.1$.

In a further preferred embodiment of the invention, the following applies for the index f: $0 \leq f \leq 0.2$, more preferably $0 \leq f \leq 0.1$.

In a further preferred embodiment of the invention, the following applies for the index g: $0 \leq g \leq 0.2$, more preferably $0 \leq g \leq 0.1$.

In a further preferred embodiment of the invention, the following applies for the index j: $0 \leq j \leq 0.4$, more preferably $0 \leq j \leq 0.2$.

In a further preferred embodiment of the invention, the following applies for the index h: $0 \leq h \leq 0.6$, more preferably $0 \leq h \leq 0.4$.

In a further preferred embodiment of the invention, the following applies for the index i: $0 \leq i \leq 0.4$, more preferably $0 \leq i \leq 0.2$.

In a further preferred embodiment of the invention, the following applies for the index k: $0 \leq k \leq 1.4$, more preferably $0 \leq k \leq 0.7$.

In a further preferred embodiment of the invention, the following applies for the index l: $0 \leq l \leq 1.4$, more preferably $0 \leq l \leq 0.7$.

In a further preferred embodiment of the invention, the following applies for the index m: $-1.0 \leq m \leq 1.0$, more preferably $-0.5 \leq m \leq 0.5$.

In a particularly preferred embodiment of the invention, the preferred ranges disclosed above apply simultaneously. It is therefore preferred when:

$0 \leq a \leq 0.6$;
$0 \leq b \leq 0.4$;
$0 \leq c \leq 0.4$;
$0.001 < d \leq 1.0$;
$0 \leq e \leq 0.2$;
$0 \leq f \leq 0.2$;
$0 \leq g \leq 0.2$;
$0 \leq j \leq 0.4$;
$0 \leq h \leq 0.6$;
$0 \leq i \leq 0.4$;
$0 \leq k \leq 1.4$;
$0 \leq l \leq 1.4$; and
$-1.0 \leq m \leq 1.0$.

Furthermore, it is particularly preferred when:

$0 \leq a \leq 0.4$;
$0 \leq b \leq 0.2$;
$0 \leq c \leq 0.2$;
$0.005 \leq d \leq 0.4$, more preferably $0.01 < d \leq 0.2$;
$0 \leq e \leq 0.1$;
$0 \leq f \leq 0.1$;
$0 \leq g \leq 0.1$;
$0 \leq j \leq 0.2$;
$0 \leq h \leq 0.4$;
$0 \leq i \leq 0.2$;
$0 \leq k \leq 0.7$;
$0 \leq l \leq 0.7$;
$-0.5 \leq m \leq 0.5$.

It is preferred that a maximum of three of the indices a, b, c, e, f, g, j, h, i, k and l is ≠0, and it is particularly preferred that a maximum of two of the indices a, b, c, e, f, g, j, h, i, k and l is ≠0.

When the compound of formula (1) contains more than one of the elements M, the ratio of Ca, Sr and Zn can be freely adjusted. It is preferred that the compound of formula (1) contains not more than one of the elements M. Particularly preferred element M are Ca or Sr.

When the compound of formula (1) contains more than one of the elements A, the ratio of Na, K and Rb can be freely adjusted. It is preferred that the compound of formula (1) contains not more than one of the elements A. A particularly preferred element A is K.

When the compound of formula (1) contains more than one of the elements RE, the ratio of La, Y and Gd can be freely adjusted. It is preferred that the compound of formula (1) contains not more than one of the elements RE. A particularly preferred element RE is La.

When the compound of formula (1) contains more than one of the elements D, the ratio of Eu, Mn, Yb and Sm can be freely adjusted. It is preferred that the compound of formula (1) contains not more than one of the elements D. A particularly preferred element D is Eu.

When the compound of formula (1) contains more than one of the elements M', the ratio of Zr and Hf can be freely adjusted. It is preferred that the compound of formula (1) contains not more than one of the elements M'. A particularly preferred element M' is Zr.

When the compound of formula (1) contains more than one of the elements A', the ratio of Li and Na can be freely adjusted. It is preferred that the compound of formula (1) contains not more than one of the elements A'. A particularly preferred element A' is Li, in particular in compounds that contain F at the same time for charge compensation.

When the compound of formula (1) contains more than one of the elements RE', the ratio of Sc and Lu can be freely adjusted. It is preferred that the compound of formula (1) contains not more than one of the elements RE'. A particularly preferred element RE' is Sc.

When the compound of formula (1) contains more than one of the elements C', the ratio of B, Al, Ga and In can be freely adjusted. It is preferred that the compound of formula (1) contains not more than one of the elements C'. Particularly preferred elements C' are Al or Ga.

When the compound of formula (1) contains more than one of the elements B', the ratio of Ge and Sn can be freely adjusted. It is preferred that the compound of formula (1) contains not more than one of the elements B'. A particularly preferred element B' is Ge.

When the compound of formula (1) contains more than one of the elements C'', the ratio of B, Al, Ga and In can be freely adjusted. It is preferred that the compound of formula (1) contains not more than one of the elements C''. Particularly preferred elements C'' are Al or Ga.

When the compound of formula (1) contains more than one of the elements X, the ratio of F and Cl can be freely adjusted. It is preferred that the compound of formula (1) contains not more than one of the elements X.

In a preferred embodiment of the present invention, the preferences for the above-mentioned elements occur at the same time. Preferred embodiments of the compounds of formula (1) are therefore the compounds of the following formula (2),

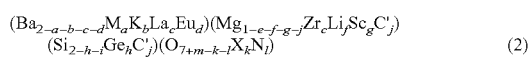
(2)

where the following applies for the symbols and indices used:

M is selected from the group consisting of Ca, Sr or mixtures of these elements;
C' is selected from the group consisting of Al, Ga or mixtures of these elements;
C'' is selected from the group consisting of Al, Ga or mixtures of these elements;
X is selected from the group consisting of F, Cl or mixtures of these elements;
N is nitrogen;
$0 \leq a \leq 0.4$;
$0 \leq b \leq 0.2$;
$0 \leq c \leq 0.2$;
$0.005 \leq d \leq 0.4$, more preferably $0.01 \leq d \leq 0.2$;
$0 \leq e \leq 0.1$;
$0 \leq f \leq 0.1$;
$0 \leq g \leq 0.1$;
$0 \leq j \leq 0.2$;
$0 \leq h \leq 0.4$;
$0 \leq i \leq 0.2$;
$0 \leq k \leq 0.7$;
$0 \leq l \leq 0.7$;
$-0.5 \leq m \leq 0.5$.

Preferred embodiments of the compound of formula (1) are the compounds of the following formulae (3) to (17),

(3)

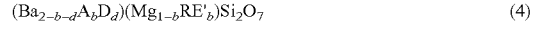
(4)

(5)

(6)

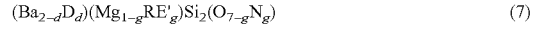
(7)

(8)

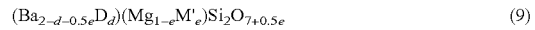
(9)

(10)

(11)

(12)

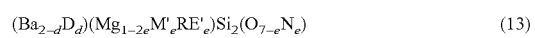
(13)

(14)

(15)

(16)

(17)

where the symbols and indices have the meanings given above and furthermore:
$b \neq 0$ in formula (3), (4) and (5),
$c \neq 0$ in formula (6),
$g \neq 0$ in formula (7),
$e \neq 0$ in formula (8) and (9),
$f \neq 0$ in formula (10), (11) and (12), and
$e \neq 0$ in formula (13).

Preferred compounds of the formulae (3) to (17) are the compounds of the following formulae (3a) to (17a),

(3a)

(3b)

$(Ba_{2-b-d}K_bEu_d)(Mg_{1-b}Sc_b)Si_2O_7$ (4a)

$(Ba_{2-b-d}K_bEu_d)Mg\ Si_2O_{7-0.5b}$ (5a)

$(Ba_{2-c-d}La_cEu_d)Mg\ Si_2(O_{7-c}N_c)$ (6a)

$(Ba_{2-d}Eu_d)(Mg_{1-g}Sc_g)Si_2(O_{7-g}N_g)$ (7a)

$(Ba_{2-d}Eu_d)(Mg_{1-e}Zr_e)Si_2O_{7+e}$ (8a)

$(Ba_{2-d-0.5e}Eu_d)(Mg_{1-e}Zr'_e)Si_2O_{7+0.5e}$ (9a)

$(Ba_{2-d}Eu_d)(Mg_{1-f}Li_f)Si_2(O_{7-f}F_f)$ (10a)

$(Ba_{2-d}Eu_d)(Mg_{1-f}Li_f)Si_2(O_{7-f}Cl_f)$ (10b)

$(Ba_{2-d}Eu_d)(Mg_{1-2f}Li_fAl_f)Si_2O_7$ (11a)

$(Ba_{2-d}Eu_d)(Mg_{1-2f}Li_fGa_f)Si_2O_7$ (11b)

$(Ba_{2-d}Eu_d)(Mg_{1-f}Li_f)(Si_{2-f}Al_f)O_7$ (12a)

$(Ba_{2-d}Eu_d)(Mg_{1-f}Li_f)(Si_{2-f}Ga_f)O_7$ (12b)

$(Ba_{2-d}Eu_d)(Mg_{1-2e}Zr_eSc_e)Si_2(O_{7-e}N_e)$ (13a)

$(Ba_{1-d}Eu_d)_2Mg\ Si_2O_7$ (14a)

$(Ba_{1-a-d}Sr_aEu_d)_2Mg\ Si_2O_7$ (15a)

$(Ba_{1-a-d}Ca_aEu_d)_2Mg\ Si_2O_7$ (15b)

$(Ba_{1-d}Eu_d)_2Mg(Si_{1-h}Ge_h)_2O_7$ (16a)

$(Ba_{2-d}Eu_d)(Mg_{1-j}Al_j)(Si_{2-j}Al_j)O_7$ (17a)

where the symbols and indices have the meanings given above and furthermore:
$b \neq 0$ in formula (3a), (3b), (4a) and (5a),
$c \neq 0$ in formula (6a),
$g \neq 0$ in formula (7a),
$e \neq 0$ in formula (8a) and (9a),
$f \neq 0$ in formula (10a), (10b), (11a), (11 b), (12a) and (12b), and
$e \neq 0$ in formula (13a).

The following compositions are examples of the compounds according to formula (1):
$Ba_{1.9}Eu_{0.1}\ MgSi_2O_7$
$Ba_{1.85}Eu_{0.1}K_{0.05}Mg_{0.95}Sc_{0.05}Si_2O_7$
$Ba_{1.9}Eu_{0.1}\ Mg_{0.96}Sc_{0.04}Si_2O_{6.96}N_{0.04}$
$Ba_{1.8}Eu_{0.1}\ La_{0.1}MgSi_2O_{6.9}N_{0.1}$
$Ba_{1.9}Eu_{0.1}\ Mg_{0.95}Li_{0.05}Si_2O_{6.95}F_{0.05}$
$Ba_{1.9}Eu_{0.1}Zr_{0.05}Mg_{0.95}Si_2(O_7+0.05O_i)$
$Ba_{1.85}Eu_{0.1}K_{0.05}MgSi_2(O_7+0.025V_O)$
$Ba_{1.9}Eu_{0.1}Zr_{0.05}Mg_{0.9}Sc_{0.05}Si_2O_7N_{0.05}$.

The compounds of the formula (1) have an emission wavelength range from about 420 to 720 nm with an emission maximum of approximately 515 nm±15 nm, i.e. they show green emission when doped with $Eu^{2+}$. The emission wavelength of the compound according to the invention, which has a coating of alumina applied by an ALD process, is unchanged compared with the emission wavelengths of uncoated compound of formula (1), respectively, i.e. the coating process does not have any influence on the initial emission color.

In the context of this application, UV light denotes light whose emission maximum is ≤400 nm, near UV light denotes light whose emission maximum is between 370-400 nm, violet light denotes light whose emission maximum is between 401 and 430 nm, blue light denotes light whose emission maximum is between 431 and 470 nm, cyan-coloured light denotes light whose emission maximum is between 471 and 505 nm, green light denotes light whose emission maximum is between 506 and 560 nm, yellow light denotes light whose emission maximum is between 561 and 575 nm, orange light denotes light whose emission maximum is between 576 and 600 nm and red light denotes light whose emission maximum is between 601 and 700 nm.

The compounds according to the invention can be excited over a broad range, which extends from about 300 to 440 nm and in particular from about 340 to 420 nm. These compounds are suitable not only for excitation by UV-, violet or blue-emitting light sources, such as LEDs or conventional energy-discharge lamps (for example based on Hg), but also for light sources which utilise the blue $In^{3+}$ line at 451 nm.

In a preferred embodiment of the invention, the compounds of formula (1) before applying the coating as well as the compounds according to the invention are in particulate form. The particle size $d_{50}$ of the compounds of formula (1), before applying the coating of aluminum oxide, is usually in the range from 50 nm to 50 μm, preferably from 1 μm to 30 μm. These values relate to the average volumetric particle size $d_{50}$ determined by Coulter Counter measurement.

In a preferred embodiment of the present invention, the coating has a thickness between 0.5 and 150 nm, more preferably between 1 and 100 nm, even more preferably between 2 and 75 nm, most preferably between 3 and 50 nm and in particular between 5 and 20 nm.

In a further embodiment of the invention, the compounds according to the invention are further treated with a hydrophobic compound in order to increase their hydrophobic nature and provide further protection against hydrolysis. The hydrophobic compound is conveniently applied as a final step in the ALD process. A suitable hydrophobic compound includes one or more alkyl or fluoroalkyl groups and at least one functional group that can react with a surface species on the surface of the particle and form a bond to the particle surface. An example for a suitable functional group is a silane or siloxane group having Si—H or Si-Hal functionalities wherein Hal is Cl, Br or I. A hydrophobic coating can also be applied by other methods.

The compound particles according to the invention may also have a surface which carries functional groups which facilitate chemical bonding to the environment, preferably consisting of epoxy or silicone resin. These functional groups can be, for example, esters or other derivatives which are bonded via oxo groups and are able to form links to constituents of the binders based on epoxides and/or silicones. Surfaces of this type have the advantage that homogeneous incorporation of the phosphors into the binder is facilitated. Furthermore, the rheological properties of the phosphor/binder system and also the pot lives can thereby be adjusted to a certain extent. Processing of the mixtures is thus simplified.

The compounds according to the invention have surprisingly high resistance to contact with moisture, as will be explained in greater detail below, and furthermore show stable emission color with almost no change in the color point over time.

The properties of the compounds according to the invention explained above and shown in more detail below are unique to compounds coated by an ALD process.

The invention furthermore relates to a process for the preparation of a compound according to the invention, comprising the following process steps:

a) provision of a compound of formula (1); and
b) forming a layer of aluminum oxide (alumina) on the surface of the compound via an atomic layer deposition process.

Compounds of formula (1) are known per se and at least some of them are commercially available. Any process for the synthesis of these compounds can be used. Preferably, the compounds are prepared by mixing europium- and silicon-containing compounds (preferably oxides, carbonates or oxalates) with barium- and/or strontium- and/or calcium- and optionally zinc- and/or magnesium-containing materials (likewise preferably oxides, carbonates or oxalates), in general with addition of at least one further inorganic or organic substance, which is usually employed as fluxing agent, and thermal treatment of the mixture. The oxides or carbonates of each of europium, silicon, barium, strontium, magnesium, zinc and/or calcium are particularly preferably employed in each case.

The reaction is usually carried out at a temperature above 900° C., preferably above 1000° C., preferably between 1000 and 1200° C. and particularly preferably between 1050 and 1150° C.

The said thermal treatment is preferably carried out at least partly under reducing conditions. The at least partially reducing conditions are established, for example, using carbon monoxide, forming gas or hydrogen (reducing conditions) or at least by means of vacuum or an oxygen-deficiency atmosphere (partially reducing conditions). A reducing atmosphere is preferably established by means of a nitrogen/hydrogen atmosphere and particularly preferably in a stream of $N_2/H_2$ (preferably in the range between 95:5 and 30:70).

The fluxing agents optionally employed are preferably at least one substance from the group of ammonium halides, in particular ammonium chloride, alkaline-earth metal fluorides, such as calcium fluoride, strontium fluoride or barium fluoride, carbonates, in particular ammonium hydrogencarbonate, various alkoxides and/or oxalates or boric acid. In the case of the use of the said alkaline-earth metal fluorides as fluxing agents, however, the proportion thereof must be included in the stoichiometric ratio of the components in the formula (1), respectively. Ammonium chloride, ammonium fluoride, boric acid ($H_3BO_3$), barium fluoride or combinations of these compounds are particularly preferably employed.

The compounds of the formula (1) are preferably prepared by a solid-state diffusion method as described above. However, processes are also known by means of which the phosphors can be prepared by wet-chemical methods from the corresponding inorganic and/or organic salts via a sol-gel process, coprecipitation process and/or drying process. Any of these methods to prepare the compounds of the formula (1) can be used as an alternative to the solid-state diffusion method.

The atomic layer deposition (ALD) process is for example described in US 2012/0199793 A1 (University of Colorado). The ALD process is characterized in that at least two different reactants are needed to form the coating layer. The reactants are introduced into the reaction zone individually, sequentially and in the gas phase. Excess amounts of reactant are removed from the reaction zone before introducing the next reactant. Reaction by-products are removed as well, between introductions of the reagents. This procedure ensures that reactions occur at the surface of the phosphor particles, rather than in the gas phase. Gas phase reactions, such as occur in chemical vapor deposition (CVD) processes, are undesirable for several reasons. CVD reactions tend to cause particle agglomeration, form uneven and non-conformal coatings and use greater amounts of raw materials than desired due to the formation of undesired side products.

A purge gas is typically introduced between the alternating feeds of the reactants, in order to further help to remove excess reactants. A carrier gas, which is usually, but not necessarily the same as the purge gas, generally is introduced during the time each reactant is introduced. The carrier gas may perform several functions, including (1) facilitating the removal of excess reactant and reaction by-products, (2) distributing the reactant through the reaction zone, thereby helping to expose all particle surfaces to the reactant and (3) fluidizing the compound particles so that all particle surfaces become exposed to the reactant.

A typical pattern of introducing reactants is:
1. Introduce purge/fluidizing gas.
2. Introduce mixture of carrier gas and first reagent.
3. Introduce purge/fluidizing gas and/or pull a high vacuum to remove excess quantities of the first reagent as well as reaction by-products.
4. Introduce mixture of carrier gas and second reagent.
5. Introduce purge/fluidizing gas and/or pull a high vacuum to remove excess quantities of the second reagent and reaction by-products.
6. Repeat steps 2-5 until desired coating thickness is obtained.

Argon, nitrogen, other inert gas, or mixture of inert gases can be used as the purge/fluidizing gas and argon, nitrogen, other inert gas, or mixture of inert gases can be used as carrier gas.

As mentioned, the same material may be used as the purge/fluidizing gas and each carrier gas. It is also possible to use different materials or combinations of materials. The preferred purge/fluidizing and carrier gases are nitrogen or argon.

Such atomic layer controlled growth techniques permit the formation of deposits of up to about 0.3 nm in thickness per reaction cycle, and thus provide a means of extremely fine control over deposit thickness. The reactions are self-limited and in most instances can be repeated to sequentially deposit additional layers of the deposited material until a desired thickness is achieved.

It is preferred to treat the particles before initiating the reaction sequence to remove volatile materials that may be adsorbed onto the particle surface. This is readily done by exposing the particles to elevated temperatures and/or vacuum. Also, in some instances a precursor reaction may be performed to introduce desirable functional groups onto the surface of the particle.

Reaction conditions are selected mainly to meet two criteria. The first criterion is that the reagents are gaseous under the conditions of the reaction. Therefore, temperature and pressure conditions are selected such that the reactants are volatilized. The second criterion is one of reactivity. Conditions, particularly temperature, are selected such that the desired reaction between the film-forming reagents (or, at the start of the reaction, the first-introduced reagent and the particle surface) occur at a commercially reasonable rate.

The temperature of the reactions may range from 250-700 K. The temperature is preferably no greater than about 475 K and more preferably no greater than 425 K. Temperatures in excess of these tend to cause diffusion of the luminescent centers from the crystalline lattice of the host material, which destroys or diminishes the ability of the particle to emit light.

Specific temperature and pressure conditions will depend on the particular reaction system, as it remains necessary to provide gaseous reactants. Subatmospheric pressures will normally be required.

A suitable apparatus for conducting the ALD reaction is one which permits the particles to become separated so that all particle surfaces become exposed to the reagents. One convenient method for exposing the base particles to the reagents is to form a fluidized bed of the particles and then pass the various reagents in turn through the fluidized bed under reaction conditions. Methods of fluidizing particulate materials are well known, and generally include supporting the particles on a porous plate or screen. A fluidizing gas is passed upwardly through the plate or screen, lifting the particles somewhat and expanding the volume of the bed. With appropriate expansion, the particles behave much as a fluid. The reagents can be introduced into the bed for reaction with the surface of the particles. In this invention, the fluidizing gas also can act as the inert purge gas for removing unreacted reagents and volatile or gaseous reaction products.

In addition, the reactions can be conducted in a rotary system, such as a rotating cylindrical vessel, a rotating tube or another rotating system. A rotating reactor comprises a hollow tube that contains the base particles. The reactor may be held at an angle to the horizontal, so that the particles pass through the tube through gravitational action. In such a case, the reactor angle determines the flow rate of the particulates through the reactor. The reactor can be rotated in order to distribute individual particles evenly and expose all particles to the reagents. The reactor design permits the substrate particles to flow in a near plug-flow condition, and is particularly suitable for continuous operations. The rotating cylindrical vessel can also be sealed on both ends and have porous metal walls that allow the gases to flow in and out of the rotating cylindrical vessel. This rotary reactor is convenient for static reactant exposures and batch processing of phosphor particles.

The progress of the reaction can be monitored using techniques such as transmission Fourier transform infrared techniques, transmission electron spectroscopy, scanning electron microscopy, Auger electron spectroscopy, x-ray fluorescence, x-ray photoelectron spectroscopy, mass spectrometry and x-ray diffraction.

The pyrosilicate compounds of formula (1) contain —O—H functional groups on the surface, which can serve as a site through which the first-applied ALD reagent can become bonded to the substrate particle. These functional groups are usually present from the synthesis of the compound and its exposure to atmospheric conditions.

The coating applied by the ALD method according to the invention contains aluminum oxide (alumina). Preferably, the coating consists exclusively of alumina.

An advantage of the ALD method is that the process is capable of forming highly uniform films at very small thicknesses. Film thickness is controlled via the number of reaction cycles that are performed. Film thickness is measured through elemental composition analysis, transmission electron microscopy, energy-dispersive X-ray spectroscopy, application testing, other methods, or a combination thereof.

The particulate is preferably non-agglomerated after the alumina layer is deposited. By "non-agglomerated", it is meant that the particles do not form significant amounts of agglomerates during the process of coating the particles. Particles are considered to be non-agglomerated if (a) the average particle size does not increase more than about 5%, preferably not more than about 2%, more preferably not more than about 1% (apart from particle size increases attributable to the coating itself and apart from fine particle losses due to flow conditions and filtration) as a result of depositing the coating, or (b) if no more than 2 weight %, preferably no more than 1 weight % of the particles become agglomerated during the process of depositing the alumina layer. This can be verified by particle size distribution analysis, imaging, application testing, or a combination thereof.

In a preferred embodiment, the deposit of alumina forms a conformal coating. By "conformal" it is meant that the thickness of the coating is relatively uniform across the surface of the particle (so that, for example, the thickest regions of the coating are no greater than 3× (preferably no greater than 2×, especially no greater than 1.5×) the thickness of the thinnest regions), so that the surface shape of the coated compound closely resembles that of the underlying compound surface. Conformality is determined by methods such as transmission electron spectroscopy (TEM) that have resolution of 10 nm or below. Lower resolution techniques cannot distinguish conformal from non-conformal coatings at this scale. The compound is preferably coated substantially without pinholes or defects. These properties are achieved by using an ALD method.

The alumina coating can be prepared on the particles having surface hydroxyl groups using the binary (AB) reaction sequence as follows. The asterisk (*) indicates the atom that resides at the surface of the particle or coating. X is a displaceable nucleophilic group. The reactions below are not balanced and are only intended to show the general principle of the reactions at the surface of the particles.

$$\text{Si—O—H}^* + \text{AlX}_3 \rightarrow \text{Si—O—AlX}^* + \text{HX} \tag{A1}$$

$$\text{Si—O—AlX}^* + \text{H}_2\text{O} \rightarrow \text{Si—O—AlOH}^* + \text{HX} \tag{B1}$$

Si—O—H indicates the surface of the silicate phosphor. In reaction (A1), reagent $\text{AlX}_3$ reacts with one or more Si—O—H groups on the surface of the particle to create a new surface group having the form AlX. Al is bonded to the particle through one or more oxygen atoms. The —Al—X group represents a site that can react with water in reaction (B1) to generate one or more hydroxyl groups. The hydroxyl groups formed in reaction (B1) can serve as functional groups through which reactions (A1) and (B1) can be repeated, each time adding a new layer of Al atoms. This condensation reaction can be promoted if desired by, for example, annealing at elevated temperatures and/or reduced pressures.

These reactions are described in more detail in A. C. Dillon et al., Surface Science 322, 230 (1995) and A. W. Ott et al., Thin Solid Films 292, 135 (1997).

A specific reaction sequence of the (A1)/(B1) type that produces alumina is:

$$\text{Al(CH}_3)_3{}^* + \text{H}_2\text{O} \rightarrow \text{Al—OH}^* + \text{CH}_4 \tag{A1A}$$

$$\text{Al—OH}^* + \text{Al(CH}_3)_3 \rightarrow \text{Al—O—Al(CH}_3)_2{}^* + \text{CH}_4 \tag{B1A}$$

This particular sequence of reactions is particularly preferred to deposit alumina, as the reactions proceed well even at temperatures below 350° K. Triethyl aluminum (TEA) or other trialkyl aluminum as well as aluminum trichloride or other aluminum trihalides can be used in place of trimethyl aluminum (TMA). Other oxidizers such as oxygen plasma radicals, ozone, alcohols, water containing isotopic oxygen and more can be used in place of normal water.

In the preferred embodiment of the present invention, a number of cycles between 1 and 1000 cycles is performed, very preferably between 10 and 500 cycles, and especially preferred between 50 and 200 cycles.

The compounds according to the invention can be used as phosphors or conversion phosphors and will therefore also be called "phosphors" or "conversion phosphors" in the following text. They can also be mixed with other phosphors, preferably with red-emitting phosphors, making mixtures of this type very highly suitable for applications in general lighting (for example for warm-white LEDs) and LCD backlighting. Furthermore, they are preferably mixed with red-emitting phosphors as well as blue-emitting phosphors when a near-UV or violet LED is used as a light source.

The present invention therefore furthermore relates to a mixture comprising at least the phosphor according to the present invention and at least one further phosphor, preferably a red-emitting or orange-emitting phosphor. If a violet or UV light source is used for excitation of the mixture, it is preferable for the mixture to furthermore comprise at least one blue-emitting phosphor.

Suitable red-emitting or orange-emitting phosphors are selected from Eu-doped and/or Ce-doped sulfoselenides, Eu- and/or Ce-doped nitrides, oxynitrides, alumosiliconitrides, Mn(IV)-doped oxides and/or fluorides and/or oxy-ortho-silicates, which can also be coated compounds. Suitable material systems which are known to the person skilled in the art are siliconitrides and alumosiliconitrides (cf. Xie, Sci. Technol. Adv. Mater. 2007, 8, 588-600), 2-5-8 nitrides, such as $(Ca,Sr,Ba)_2Si_5N_8:Eu^{2+}$ (Li et al., Chem. Mater. 2005, 15, 4492), and alumosiliconitrides, such as $(Ca,Sr)AlSiN_3:Eu^{2+}$ (K. Uheda et al., Electrochem. Solid State Lett. 2006, 9, H22) or variants of the said compounds, in which individual lattice positions are substituted by other chemical elements, such as alkali metals, aluminum, gallium or gadolinium, or further elements of this type occupy flaws as dopant. Further preferred red phosphors are α-SiAlON of the formula $(AE)_xEu_y(Si,Al)_{12}(O,N)_{16}$. Further preferred are compounds of the formula $(AE)_{2-0.5y-x} Eu_x Si_5N_{8-y} O_y$ and $(AE)_{2-x+1.5z}Eu_xSi_5N_{8-2/3x-z}O_x$ where AE stands for one or more elements selected from Ca, Sr and Ba, x is a value in the range from 0.005 to 1, y is a value in the range from 0.01 to 3 and z is a value in the range from 0 to 2. These compounds can furthermore contain $SiO_2$ and/or $Si_3N_4$. Compounds of this type are described in greater detail in EP 2528991. In these compounds, AE in preferred embodiments stands for Sr, while x in preferred embodiments is a value in the range from 0.01 to 0.8, preferably in the range 0.02 to 0.7 and particularly preferably in the range 0.05 to 0.6 and especially preferably in the range 0.1 to 0.4, and y in preferred embodiments is a value in the range from 0.1 to 2.5, preferably in the range from 0.2 to 2 and particularly preferably in the range from 0.22 to 1.8, and z in preferred embodiments is a value in the range of 0 to 1, in particular 0.

The green-emitting phosphor is preferably selected from garnets, such as LuAG, LuGaAG, YAG, YGaAG, Gd-doped LuAG, Gd-doped YAG, which can also additionally contain alkaline earth halide, such as $BaF_2$, ortho-silicates, which can also be coated compounds according to the present invention, or β-SiAlON.

The blue-emitting phosphor is preferably selected from BAM, halophosphates and disilicates, such as $(AE)_3MgSi_2O_8:Eu$ where AE is selected from Ca, Sr, Ba, Zn or mixtures of these elements.

It might be preferred that the further phosphors used in combination with the phosphors according to the present invention also have a coating, in particular a coating of aluminum oxide, preferably applied by an ALD process. This is in particular the case when the further phosphor is a silicate phosphor.

TABLE 1

Red, orange, green and cyan emitting phosphors, which can be used in combination with the phosphors according to the invention

| Composition | Emission color | $\lambda_{max}$ [nm] |
|---|---|---|
| $BaMgAl_{10}O_{17}:Eu$ | blue | 450 |
| $(AE)_5(PO_4)_3(halide):Eu$ | blue to cyan | 450-490 |
| $(AE)_3MgSi_2O_8:Eu$ | blue to cyan | 440-490 |
| $LaAl(Si_{6-z}Al_z)-(N_{10-z}O_z):Ce$ | cyan | 460-500 |
| $(Lu,Y,Gd,Tb)_3(Al,Ga)_5(O,N)_{12}$ | cyan to orange | 470-610 |
| $CaSi_2O_{2-z}N_{2+2/3z}:Eu$ | green | 534-562 |
| γ-AlON:Mn—Mg | green | 512 |
| $(Ba_{1-x}Sr_x)_2SiO_4:Eu$ | green | 520-560 |
| $SrGa_2S_4:Eu$ | green | 535 |
| $SrSi_2N_2O_2:Eu$ | green | 535-554 |
| β-SiAlON | green | 525-550 |
| $SrAlSi_4N_7:Eu$ | cyan and red | 500, 632 |
| $Ba_2ZnS_3:Ce, Eu$ | cyan and red | 498, 655 |
| $(Sr_{1-x}Ca_x)_2SiO_4:Eu$ | orange | 560-600 |
| MgS:Eu | orange | 580 |
| $Sr_3SiO_5:Eu$ | orange | 570 |
| $Ca_2BO_3Cl:Eu$ | orange | 573 |
| Li-α-SiAlON:Eu | orange | 573 |
| $CaAlSiN_3:Ce$ | orange | 580 |
| $SrLi_2SiO_4:Eu$ | orange | 562 |
| $Ca_2SiS_4:Eu$ | orange to red | 550, 660 |
| $Y_3Mg_2AlSi_2O_{12}:Ce$ | orange to red | 600 |
| $(Ca_{1-x-y}Sr_xBa_y)_2Si_5N_8:Eu$ | orange to red | 580-640 |
| $(Ca_{1-x}Sr_x)AlSiN_3:Eu$ | red | 630-650 |
| $(Ca_{1-x}Sr_x)AlSi(N,O)_3:Eu$ | red | 600-650 |
| $Lu_2CaMg_2Si_3O_{12}:Ce$ | red | 605 |
| $Sr_3(Al_2O_5)Cl_2:Eu$ | red | 610 |
| $Sr_2Si_5N_8:Eu$ | red | 625 |
| $CaSiN_2:Ce$ | red | 625 |
| $SrSiN_2:Eu$ | red | 670-685 |
| $(Ca_{1-x}Sr_x)S:Eu$ | red | 610-655 |
| KSF:Mn | red | 630 |
| $(Ca,Sr,Ba)(Mg_2SiN_4):Eu$ | red | 590-625 |
| $(Ca,Sr,Ba)(LiAl_3N_4):Eu$ | red | 600-670 |
| $Sr_3SiO_5:Ce, Li$ | cyan to red | 465-700 |
| Ca-α-SiAlON:Eu | cyan to red | 500-700 |
| $MgSiN_2:Mn$ | yellow to red | 550-800 |

In the mixture according to the invention comprising at least one phosphor according to the invention and at least one further phosphor, in particular at least one red-emitting or green-emitting phosphor, the ratio of phosphors according to the invention and the further phosphor(s) is in accordance with the invention 25:1 to 1:1, based on the total weight of the phosphors. It is preferred in accordance with the invention for the at least one phosphor according to the invention and the at least one further phosphor, in particular the at least one green-yellow-emitting or orange-red-emitting phosphor, to be present in the weight ratio of green-yellow emitting to orange-red-emitting phosphor of 10:1 to 3:1 and particularly preferably 6:1 to 4:1, based on the total weight of these phosphors.

The phosphors according to the invention can particularly advantageously be employed in light-emitting diodes (LEDs), and especially in the pc-LEDs already mentioned above.

For use in LEDs, the phosphors according to the invention can also be converted into any desired other outer shapes, such as spherical particles, flakes and structured materials and ceramics. These shapes are usually summarized under the term "shaped bodies". The shaped body here is preferably a "phosphor body".

The phosphors according to the invention are therefore particularly preferably employed in shaped bodies, or in phosphor bodies, comprising the silicate phosphors according to the invention.

The production of ceramic phosphor bodies comprising the phosphors according to the invention is preferably carried out analogously to the process described in DE 10349038. The said patent specification is therefore incorporated in its full scope into the context of the present application by way of reference. In this process, the phosphor is subjected to isostatic pressing and applied directly to the surface of a chip in the form of a homogeneous, thin and non-porous flake. There is thus no location-dependent variation of the excitation and emission of the phosphor, which means that the LED provided therewith emits a homogeneous light cone of constant color and has high light output. The ceramic phosphor bodies can be produced on a large industrial scale, for example, as flakes in thicknesses of a few 100 nm to about 500 µm. The flake dimensions (length× width) are dependent on the arrangement. In the case of direct application to the chip, the size of the flake should be selected in accordance with the chip dimensions (from about 100 µm*100 µm to several mm$^2$) with a certain oversize of about 10% to 30% of the chip surface with a suitable chip arrangement (for example flip-chip arrangement) or correspondingly. If the phosphor flake is installed over a finished LED, all of the exiting light cone passes through the flake.

The side surfaces of the ceramic phosphor body can be coated with a light metal or noble metal, preferably aluminum or silver. The metal coating has the effect that light does not exit laterally from the phosphor body. Light exiting laterally can reduce the luminous flux to be coupled out of the LED. The metal coating of the ceramic phosphor body is carried out in a process step after the isostatic pressing to give rods or flakes, where the rods or flakes can optionally be cut to the requisite size before the metal coating. To this end, the side surfaces are wetted, for example, with a solution comprising silver nitrate and glucose and subsequently exposed to an ammonia atmosphere at elevated temperature. A silver coating, for example, forms on the side surfaces in the process. Alternatively, current-less metallisation processes are also suitable, see, for example, Hollemann-Wiberg, Lehrbuch der Anorganischen Chemie [Textbook of Inorganic Chemistry], Walter de Gruyter Verlag or Ullmanns Enzyklopadie der chemischen Technologie [Ullmann's Encyclopaedia of Chemical Technology].

The ceramic phosphor body can, if necessary, be fixed to an LED chip serving as baseboard using a water-glass solution.

In a preferred embodiment, the ceramic phosphor body has a structured (for example pyramidal) surface on the side opposite an LED chip. This enables as much light as possible to be coupled out of the phosphor body. The structured surface on the phosphor body is produced by carrying out the isostatic pressing using a compression mould having a structured pressure plate and thus embossing a structure into the surface. Structured surfaces are desired if the aim is to produce the thinnest possible phosphor bodies or flakes. The pressing conditions are known to the person skilled in the art (see J. Kriegsmann, Technische keramische Werkstoffe [Industrial Ceramic Materials], Chapter 4, Deutscher Wirtschaftsdienst, 1998). It is important that the pressing temperatures used are ⅔ to ⅚ of the melting point of the substance to be pressed.

However, embodiments for the application of the phosphors according to the invention to a light-emitting diode are also possible (see Example 4, GaN chip as LED chip), in which a phosphor layer to be applied, which is intended to comprise the phosphors according to the invention, is applied by bulk casting, preferably by bulk casting from a mixture of silicone or an epoxy resin and homogeneous silicate phosphor particles.

The present invention furthermore relates to a light source which comprises a semiconductor and at least one phosphor according to the invention.

Particular preference is given here to a light source which comprises a semiconductor and at least one phosphor according to the invention and at least one other, preferably orange-red-emitting and optionally also a further blue-emitting, phosphor. This light source is preferably white-emitting or emits light having a certain color point (color-on-demand principle). The color-on-demand concept is taken to mean the production of light having a certain color point using a pc-LED (=phosphor-converted LED) using one or more phosphors.

The further phosphors employed here are preferably the red-emitting and green-emitting phosphors already described in greater detail above.

In a preferred embodiment of the light source according to the invention, the semiconductor is a luminescent indium aluminum gallium nitride, in particular of the formula $In_iGa_jAl_kN$, where $0 \leq i$, $0 \leq j$, $0 \leq k$, and $i+j+k=1$. These can be light-emitting LED chips of various structure.

In a further preferred embodiment of the light source according to the invention, the light source is a luminescent arrangement based on ZnO, TCO (transparent conducting oxide), ZnSe or SiC or an arrangement based on an organic light-emitting layer (OLED).

In a further preferred embodiment of the light source according to the invention, the light source is a source which exhibits electroluminescence and/or photoluminescence. The light source may furthermore also be a plasma or discharge source or a laser.

The phosphors according to the invention can either be dispersed in a resin (for example epoxy or silicone resin) or, in the case of suitable size ratios, arranged directly on the light source or alternatively arranged remote therefrom, depending on the application (the latter arrangement also includes "remote phosphor technology"). The advantages of remote phosphor technology are known to the person skilled in the art and are revealed, for example, by the following publication: Japanese J. of Appl. Phys. Vol. 44, No. 21 (2005), L649-L651.

The optical coupling of the lighting unit described above between the silicate phosphor or the phosphor mixture comprising the silicate phosphor according to the invention and the semiconductor can also be achieved by a light-conducting arrangement. This makes it possible for the semiconductor to be installed at a central location and to be optically coupled to the phosphor by means of light-conducting devices, such as, for example, optical fibres. In this way, it is possible to achieve lamps adapted to the lighting wishes which merely consist of one or various phosphors, which can be arranged to form a light screen, and an optical waveguide, which is coupled to the light source. In this way, it is possible to place a strong light source at a location which is favourable for electrical installation and to install lamps comprising phosphors which are coupled to the optical waveguides at any desired locations without further electrical cabling, but instead only by laying optical waveguides.

The invention furthermore relates to a lighting unit, in particular for the backlighting of display devices, which comprises at least one light source described above and thus at least one phosphor according to the invention. Lighting units of this type are employed principally in display devices, in particular liquid-crystal display devices (LC displays), having backlighting. The present invention therefore also relates to a display device of this type.

The present invention furthermore relates to the use of the phosphors according to the invention as conversion phosphor, preferably for the partial or complete conversion of the blue, violet or near-UV emission from a luminescent diode. Near-UV emission in the sense of this application means emission in a wavelength range from 370 to 400 nm.

Preference is furthermore given to the use of the phosphors according to the invention for the conversion of blue, violet or near-UV emission into visible white radiation.

The use of the phosphors according to the invention in electroluminescent materials, such as, for example, electroluminescent films (also known as lighting films or light films), in which, for example, zinc sulfide or zinc sulfide doped with $Mn^{2+}$, $Cu^+$ or $Ag^+$ is employed as emitter, which emit in the yellow-green region is also advantageous in accordance with the invention. The areas of application of the electroluminescent film are, for example, advertising, display backlighting in liquid-crystal display screens (LC displays) and thin-film transistor (TFT) displays, self-illuminating vehicle license plates, floor graphics (in combination with a crush-resistant and slip-proof laminate), in display and/or control elements, for example in automobiles, trains, ships and aircraft, or also domestic appliances, garden equipment, measuring instruments or sport and leisure equipment.

Compared with silicate phosphors of the formula (1) according to the state of the art, which are not coated with alumina by an ALD process, the phosphors according to the invention have excellent resistance to moisture, which permanently reduces the drop in the intensity of the phosphor over an extended period in contact with atmospheric moisture.

In addition, the phosphors according to the invention have emission spectra whose maximum is neither shifted nor reduced compared with the emission maximum of commercially available silicate phosphors which have not been coated with alumina with an ALD process, thus showing a stable color point over time.

The phosphors according to the invention can be employed successfully in all conventional application media in which conventional compounds of formula (1) are employed.

The following examples are intended to illustrate the present invention. However, they should in no way be regarded as limiting. All compounds or components which can be used in the compositions are either known and commercially available or can be synthesised by known methods. The temperatures indicated in the examples are in ° C. It furthermore goes without saying that, both in the description and also in the examples, the added amounts of the components in the compositions always add up to a total of 100%. Percentage data given should always be regarded in the given context. However, they usually always relate to the weight of the part-amount or total amount indicated.

Even without further comments, it is assumed that a person skilled in the art will be able to utilize the above description in its broadest scope. The preferred embodiments should therefore merely be regarded as descriptive disclosure which is absolutely not limiting in any way. The complete disclosure content of all applications and publications mentioned above and below is incorporated into this application by way of reference.

Those skilled in the art will acknowledge that the invention can be practiced with modification and is not restricted to the above-disclosed embodiments and the examples shown below. The present invention may be utilized in various arrangements and modifications that are considered to be within the spirit and scope of the appended claims.

EXAMPLES

The enhanced stability of ALD-treated pyrosilicate phosphors is shown by the examples as follows:

Example 1: Synthesis of $Ba_{1.90}Eu_{0.10}MgSi_2O_7$ 112.49 g $BaCO_3$
29.14 g $Mg_5(CO_3)_4(OH)_2$
5.28 g $Eu_2O_3$
37.20 g $SiO_2$
1.60 g $NH_4Cl$ The starting materials are mixed by ball milling for 2 hours and fired at 1100° C. for 6 h in an $H_2$:$N_2$ (70:30) atmosphere. After firing, the material is ground into a fine powder, washed in water, dried and sieved using a 50 μm nylon sieve to narrow the particle size range. The resulting compound shows an emission maximum at 512 nm (x=0.252; y=0.514).

Example 2: Synthesis of $Ba_{1.85}K_{0.05}Eu_{0.10}MgSi_2O_{6.95}Cl_{0.05}$ 14.60 g $BaCO_3$
0.15 g $K_2CO_3 \times 0.5H_2O$
3.89 g $Mg_5(CO_3)_4(OH)_2$
0.70 g $Eu_2O_3$
4.96 g $SiO_2$
0.21 g $NH_4Cl$ The starting materials are mixed in a mechanical mortar for 20 minutes and fired at 1100° C. for 6 h in an $H_2$:$N_2$ (70:30) atmosphere. After firing, the material is ground into a fine powder, washed in water, dried and sieved using a 50 μm nylon sieve to narrow the particle size range. The resulting compound shows an emission maximum at 518 nm (x=0.273; y=0.521).

Example 3: Synthesis of $Ba_{1.85}K_{0.05}Eu_{0.10}MgSi_2O_{6.95}F_{0.05}$ 14.60 g $BaCO_3$
0.12 g KF
3.89 g $Mg_5(CO_3)_4(OH)_2$
0.70 g $Eu_2O_3$
4.96 g $SiO_2$
0.21 g $NH_4Cl$ The starting materials are mixed in a mechanical mortar for 20 minutes and fired at 1100° C. for 6 h in an $H_2$:$N_2$ (70:30) atmosphere. After firing, the material is ground into a fine powder, washed in water, dried and sieved using a 50 μm nylon sieve to narrow the particle size range. The resulting compound shows an emission maximum at 516 nm (x=0.260; y=0.520).

Example 4: Synthesis of $Ba_{1.90}Eu_{0.10}Mg_{0.95}Li_{0.05}Si_2O_{6.95}Cl_{0.05}$ 15.00 g $BaCO_3$
0.07 g $Li_2CO_3$
3.69 g $Mg_5(CO_3)_4(OH)_2$ 0.70 g $Eu_2O_3$
4.96 g $SiO_2$
0.21 g $NH_4Cl$ The starting materials are mixed in a mechanical mortar for 20 minutes and fired at 1100° C. for 6 h in an $H_2:N_2$ (70:30) atmosphere. After firing, the material is ground into a fine powder, washed in water, dried and sieved using a 50 µm nylon sieve to narrow the particle size range. The resulting compound shows an emission maximum at 513 nm (x=0.253; y=0.517).

Example 5: Synthesis of $Ba_{1.90}Eu_{0.10}Mg_{0.95}Li_{0.05}Si_2O_{6.95}F_{0.05}$ 15.00 g $BaCO_3$
0.07 g $Li_2CO_3$
3.69 g $Mg_5(CO_3)_4(OH)_2$
0.70 g $Eu_2O_3$
4.96 g $SiO_2$
0.21 g $NH_4Cl$
0.21 g $BaF_2$ The starting materials are mixed in a mechanical mortar for 20 minutes and fired at 1100° C. for 6 h in an $H_2:N_2$ (70:30) atmosphere. After firing, the material is ground into a fine powder, washed in water, dried and sieved using a 50 µm nylon sieve to narrow the particle size range. The resulting compound shows an emission maximum at 518 nm (x=0.272; y=0.528).

Example 6: Synthesis of $Ba_{1.90}Eu_{0.10}Mg_{0.80}Li_{0.1}Al_{0.1}Si_2O_7$ 15.00 g $BaCO_3$
0.15 g $Li_2CO_3$
3.11 g $Mg_5(CO_3)_4(OH)_2$
0.70 g $Eu_2O_3$
4.96 g $SiO_2$
0.21 g $NH_4Cl$
0.20 g $Al_2O_3$ The starting materials are mixed in a mechanical mortar for 20 minutes and fired at 1100° C. for 6 h in an $H_2:N_2$ (70:30) atmosphere. After firing, the material is ground into a fine powder, washed in water, dried and sieved using a 50 µm nylon sieve to narrow the particle size range. The resulting compound shows an emission maximum at 521 nm (x=0.289; y=0.527).

Example 7: Synthesis of $Ba_{1.90}Eu_{0.10}Mg_{0.95}Zr_{0.05}Si_2O_{7.05}$ 15.00 g $BaCO_3$
3.69 g $Mg_5(CO_3)_4(OH)_2$
0.70 g $Eu_2O_3$
4.96 g $SiO_2$
0.21 g $NH_4Cl$
0.25 g $ZrO_2$ The starting materials are mixed in a mechanical mortar for 20 minutes and fired at 1100° C. for 6 h in an $H_2:N_2$ (70:30) atmosphere. After firing, the material is ground into a fine powder, washed in water, dried and sieved using a 50 µm nylon sieve to narrow the particle size range. The resulting compound shows an emission maximum at 516 nm (x=0.260; y=0.515).

Example 8: Synthesis of $Ba_{1.90}Eu_{0.10}Mg_{0.95}Sc_{0.05}Si_2O_{7.025}$ 7.499 g $BaCO_3$
1.845 g $Mg_5(CO_3)_4(OH)_2$
0.352 g $Eu_2O_3$
2.463 g $SiO_2$
0.107 g $NH_4Cl$
0.069 g $Sc_2O_3$ The starting materials are mixed in a mechanical mortar for 20 minutes and fired at 1100° C. for 6 h in an $H_2:N_2$ (70:30) atmosphere. After firing, the material is ground into a fine powder, washed in water, dried and sieved using a 50 µm nylon sieve to narrow the particle size range. The resulting compound shows an emission maximum at 512 nm (x=0.255, y=0.498).

Example 9: Synthesis of $Ba_{1.86}Eu_{0.10}La_{0.04}MgSi_2O_{7.02}$ 11.779 g $BaCO_3$
3.185 g $Mg_5(CO_3)_4(OH)_2$
0.577 g $Eu_2O_3$
4.040 g $SiO_2$
0.175 g $NH_4Cl$
0.214 g $La_2O_3$ The starting materials are mixed in a mechanical mortar for 20 minutes and fired at 1100° C. for 6 h in an $H_2:N_2$ (70:30) atmosphere. After firing, the material is ground into a fine powder, washed in water, dried and sieved using a 50 µm nylon sieve to narrow the particle size range. The resulting compound shows an emission maximum at 512 nm (x=0.255, y=0.507).

Example 10: Comparison Between ALD-Treated Pyrosilicate of Examples 1 to 9 Stabilized by 100 Cycles Coating with Untreated Pure Pyrosilicates of Examples 1 to 9

Deposition of the $Al_2O_3$ Coating:

An ALD film was deposited on the untreated pure pyrosilicates of Examples 1 to 9 using trimethylaluminum and water vapor. One hundred (100) A-B cycles were performed at reduced pressure and 180° C. within a 500 mL stainless steel fluidized bed reactor (600 g batch). The precursors were alternately dosed between nitrogen purges, to ensure ALD reactions and not CVD. $N_2$ is used as the carrier gas.

The results are comparable for pyrosilicate materials coated in a fluidized bed reactor and pyrosilicate materials coated in a rotary system.

Example 11: Comparative Example for Wet-Chemical Coating with Alumina 15 g of $Ba_{1.90}Eu_{0.10}MgSi_2O_7$ (Example 1) pyrosilicate phosphor was dispersed in 500 cm³ of water at 80° C. under vigorous and continuous stirring. The pH of the solution was adjusted to about 7.5 with a NaOH solution. Simultaneous addition of 2.5 g of $Al(NO_3)_3*9H_2O$ (dissolved in 100 cm³ of water) and NaOH solution followed. The amount of sodium hydroxide was adjusted such that the pH remained constant (within ±0.2) at 7.5, pH required for $Al(OH)_3$ precipitation. After full addition of the aluminum nitrate solution, the phosphor was stirred for 1 h at same condition in order to age the precipitate. Filtering and washing steps followed, after which the phosphor was dried and a calcination step was applied at 350° C. for 1 h. This step is required in order to transform the aluminum hydroxide into aluminum oxide. Such prepared phosphor was used to fabricate the LEDs use for comparative studies.

Example 12: Prototype LED Fabrication

The prototype LEDs used for the LED tests are fabricated as follows: Silicone binder (OE 6370HF, Dow Corning) and phosphors according to Examples 10 and 11 or the corresponding uncoated phosphors according to Examples 1 to 9 are mixed in the weight ratio 79:21. The slurries are filled into empty LED packages of 3528 type equipped with violet dye emitting at 407 nm or 410 nm (operation at 350 mA) by means of volume dispensing by means of an automated dispensing equipment. The silicone is cured for 4 h at 150° C.

Example 13: LED Reliability Test

The prototype LEDs used for the LED reliability tests are fabricated as follows: Silicone binder (OE 6370, Dow Corning) and phosphors according to Examples 10 and 11 or the corresponding uncoated phosphors according to Examples 1 to 9 are mixed in the weight ratio 79:21. The slurries are filled into empty LED packages of 3528 type equipped with blue dye emitting at 450 nm (operation at 20 mA) by means of volume dispensing. The silicone is cured for 2 h at 150° C.

LEDs fabricated as described are introduced into a climate chamber operating at 85° C./85% rel. humidity. The LEDs are stored under these conditions for at least 1000 h and driven at 20 mA (constant operation). Within this timeframe, the devices are taken out of the climate chamber several times to characterize the chromaticity and the LED brightness by means of a spectroradiometer at 20 mA driving conditions. After completion of measurements the LEDs are reinstalled into the climate chamber.

According to E. Fred Schubert "Light-Emitting Diodes", Cambridge University Press (2003) the lifetime of an LED is >>1000 hrs. The human eye can differentiate chromaticity differences of $\Delta x = \Delta y \approx 0.004$.

As can be seen from FIGS. 2 to 9 below, the non-stabilized pyrosilicate phosphors show a poorer reliability such as a decreased lifetime and an increased color coordinate shift when compared to pyrosilicate phosphors which were stabilized according to the present invention. Thus, it could be shown that the reliability greatly improves when the material is coated by a thin layer of alumina using the atomic layer deposition (ALD) method. Even alternative coating methods, such as e.g. sol-gel/wet chemical alumina deposition or CVD which were described in the past (e.g. H. Winkler et al. in WO 2015/062697 A1) show a worse performance when compared to the coated pyrosilicates according to the present invention. FIGS. 8 and 9 below show a comparison of different stabilization levels of pyrosilicates using ALD coating with alumina as well as wet chemical coating with alumina in terms of reliability testing monitoring the brightness change as well as the color coordinate shift (x,y shift). The data below shows that ALD coating gives the best performance improvement for pyrosilicates, while the wet chemical alumina deposition, though it improves the stability to some degree, is not sufficient. It is expected that this trend will be practically the same for co-doped pyrosilicates, (e.g. $Zr^{4+}$ in place of $Mg^{2+}$ as shown in FIGS. 6 and 7), since the co-doping does not fundamentally change the phosphor's sensitivity towards water and heat.

The behavior of the LED with ALD treated phosphor remains almost unchanged. In contrast the LED built with untreated phosphor shows strong shift of color point during reliability testing.

Figure 1:
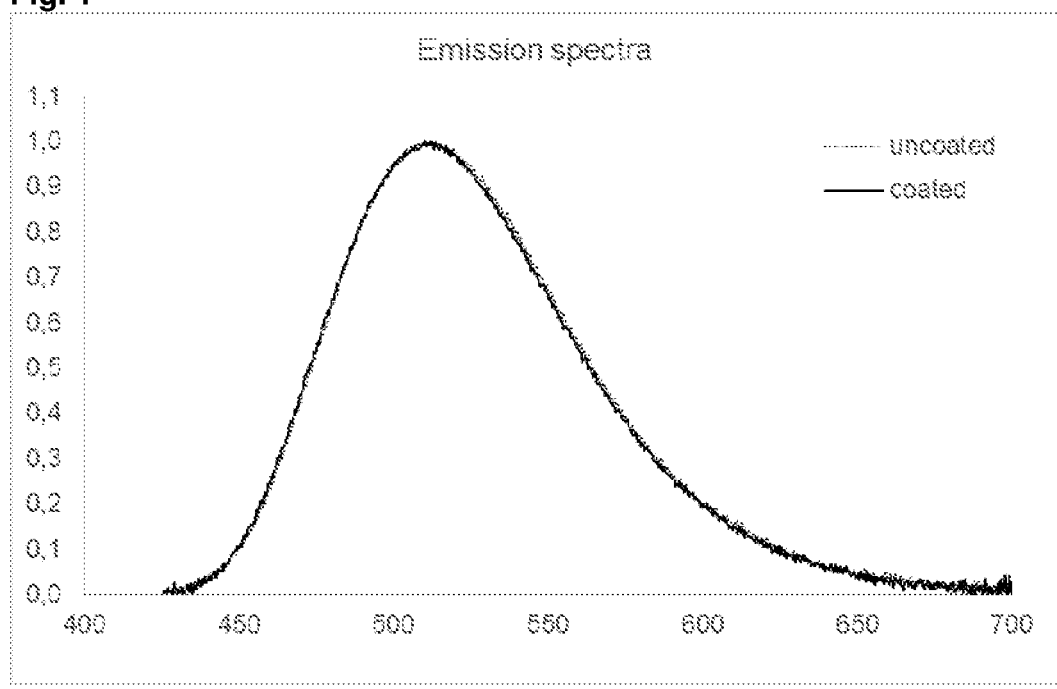
FIG. 1: Emission spectra of uncoated (Example 1) and rotary ALD coated system alumina-coated (Example 10) pyrosilicate $Ba_{1.90}Eu_{0.10}MgSi_2O_7$ under a 410 nm excitation. The intensity and emission band shape remains unchanged after deposition process.
Figure 2:
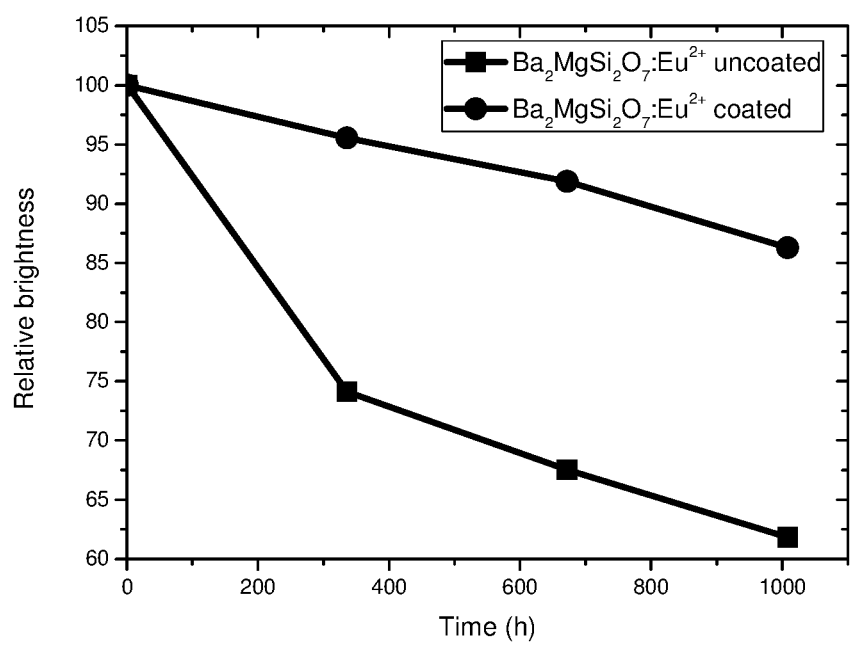
FIG. 2: Reliability comparison (brightness) between the uncoated (Example 1) and alumina-coated (Example 10) pyrosilicate $Ba_{1.90}Eu_{0.10}MgSi_2O_7$ in an LED reliability test (in a standard 85° C./85% rel. humidity, storage time t=1000 h testing conditions with a 20 mA driving current): the LED intensity of the ALD treated phosphor (Example 10) remains almost unchanged; in contrast the brightness of the LED built with untreated phosphor (Example 1) decreases.
Figure 3:
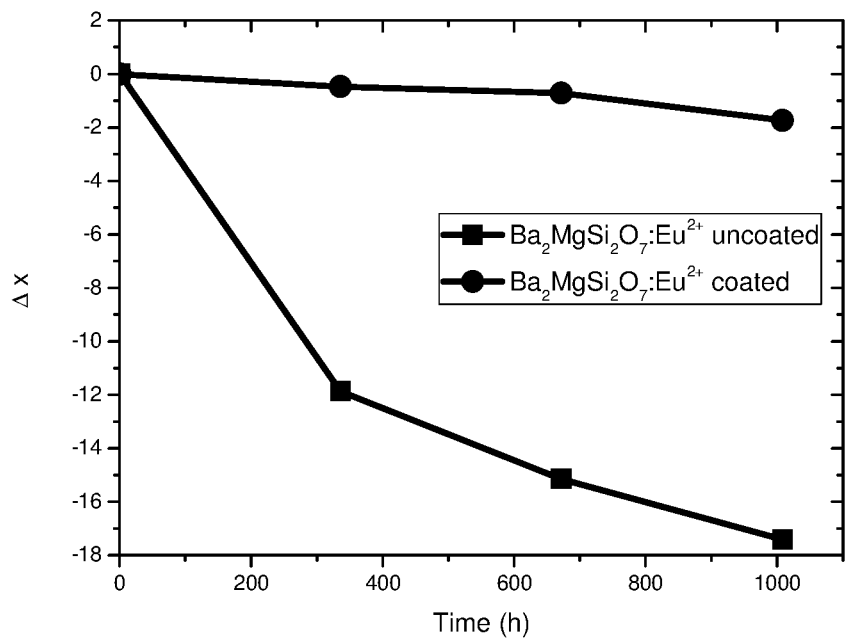
FIG. 3: Reliability comparison (CIE 1931 x co-ordinate drift) between the uncoated (Example 1) and alumina-coated (Example 10) pyrosilicate $Ba_{1.90}Eu_{0.10}MgSi_2O_7$ in an LED reliability test (in a standard 85° C./85% rel. humidity, storage time t=1000 h testing conditions with a 20 mA driving current):
a) CIE 1931 x coordinate drift over time;
b) CIE 1931 y coordinate drift over time.
Figure 3:
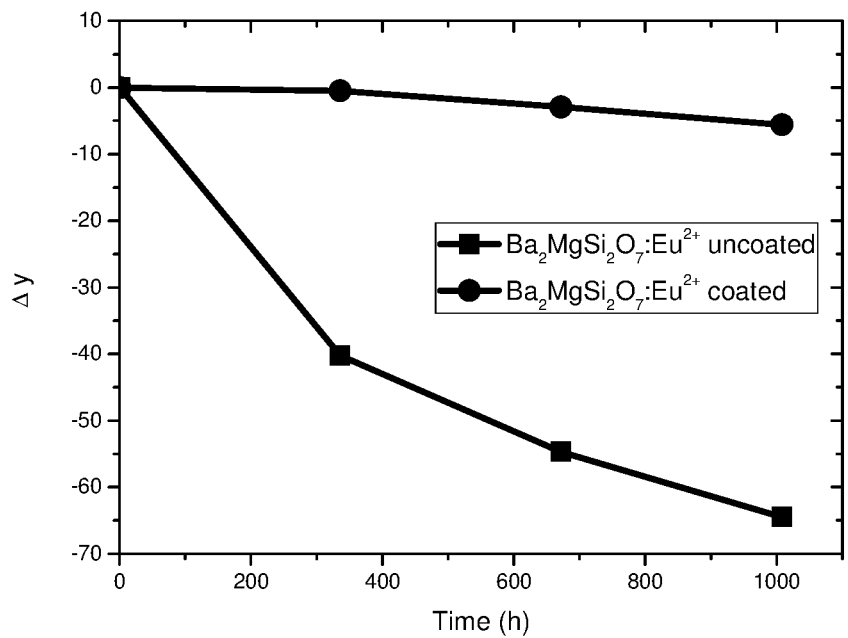
Figure 4:
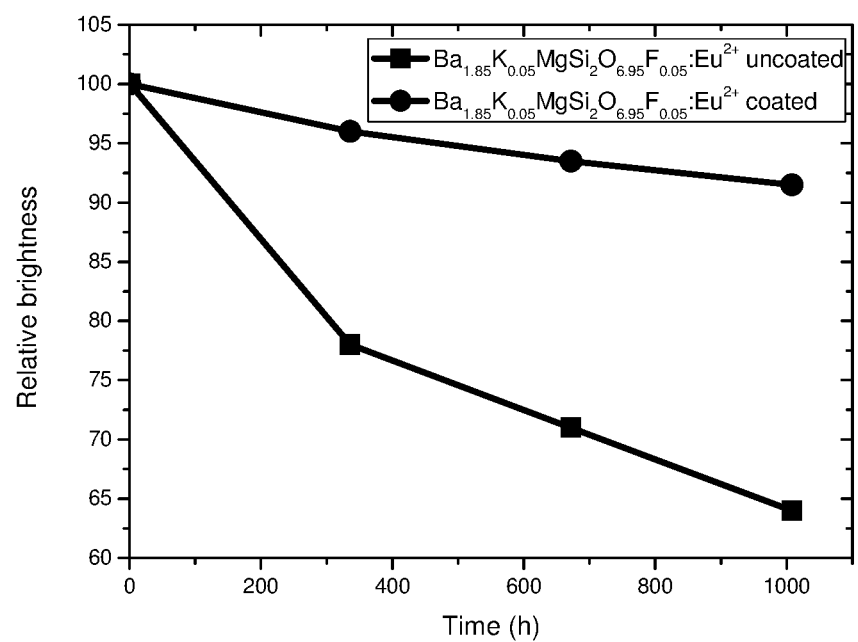

FIG. 4: Reliability comparison (brightness) between the uncoated (Example 3) and alumina-coated (Example 10) pyrosilicate $Ba_{1.85}K_{0.05}MgSi_2O_{6.95}F_{0.05}:Eu^{2+}$ in an LED reliability test (in a standard 85° C./85% rel. humidity, storage time t=1000 h testing conditions with a 20 mA driving current): the LED intensity of the ALD treated phosphor (Example 10) remains almost unchanged; in contrast the brightness of the LED built with untreated phosphor (Example 3) decreases.

Figure 5:
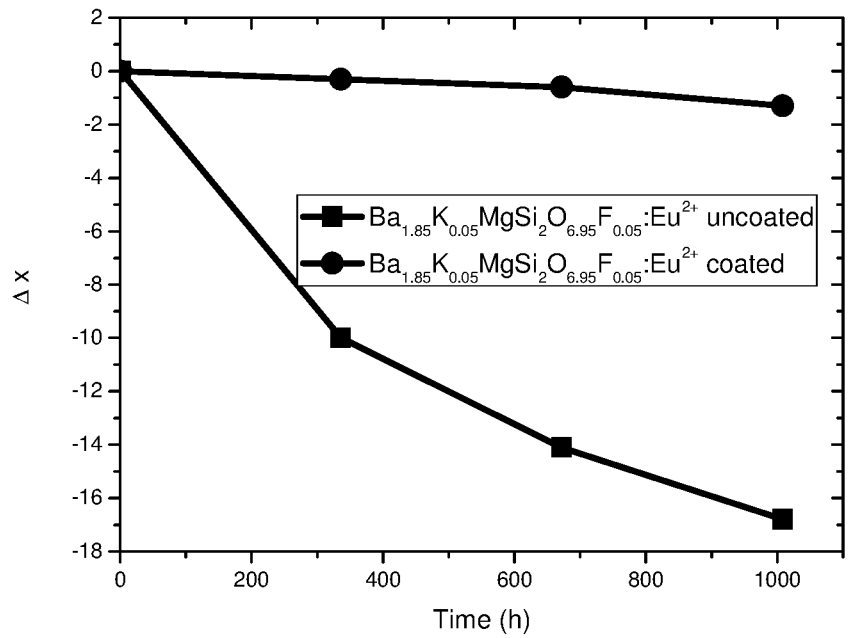
Figure 5:
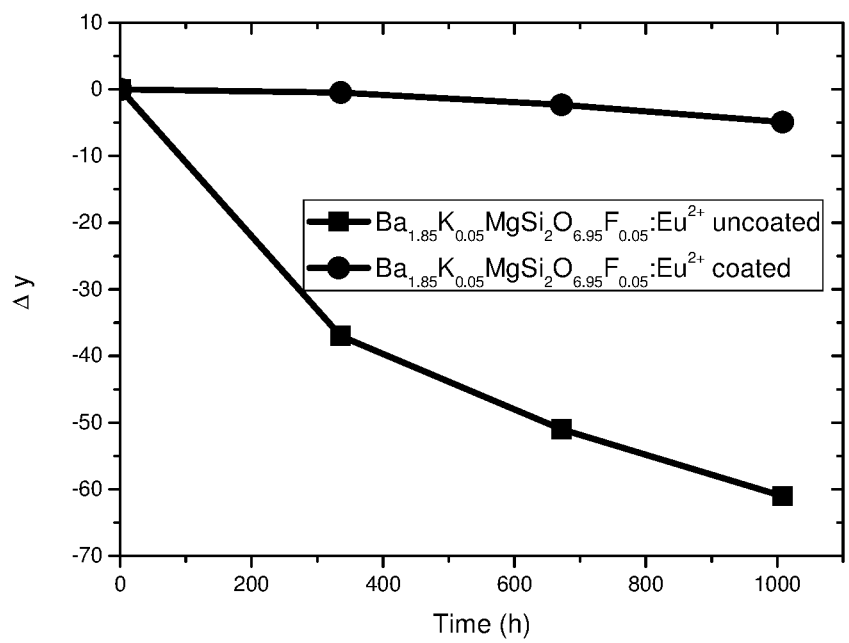

FIG. 5: Reliability comparison (CIE 1931 x co-ordinate drift) between the uncoated (Example 3) and alumina-coated (Example 10) pyrosilicate $Ba_{1.85}K_{0.05}MgSi_2O_{6.95}F_{0.05}:Eu^{2+}$ in an LED reliability test (in a standard 85° C./85% rel. humidity, storage time t=1000 h testing conditions with a 20 mA driving current):
a) CIE 1931 x coordinate drift over time;
b) CIE 1931 y coordinate drift over time.

The behavior of the LED with ALD treated phosphor remains almost unchanged. In contrast the LED built with untreated phosphor shows strong shift of color point during reliability testing.

Figure 6:
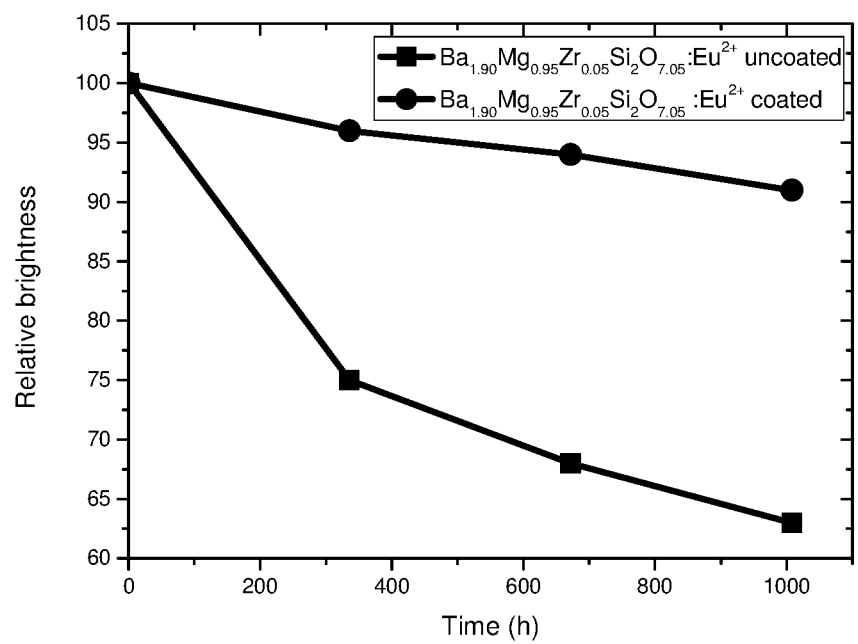

FIG. 6: Reliability comparison (brightness) between the uncoated (Example 7) and alumina-coated (Example 10) pyrosilicate $Ba_{1.90}Mg_{0.95}Zr_{0.05}Si_2O_{7.05}:Eu^{2+}$ in an LED reliability test (in a standard 85° C./85% rel. humidity, storage time t=1000 h testing conditions with a 20 mA driving current): the LED intensity of the ALD treated phosphor (Example 10) remains almost unchanged; in contrast the brightness of the LED built with untreated phosphor (Example 7) decreases.

Figure 7:
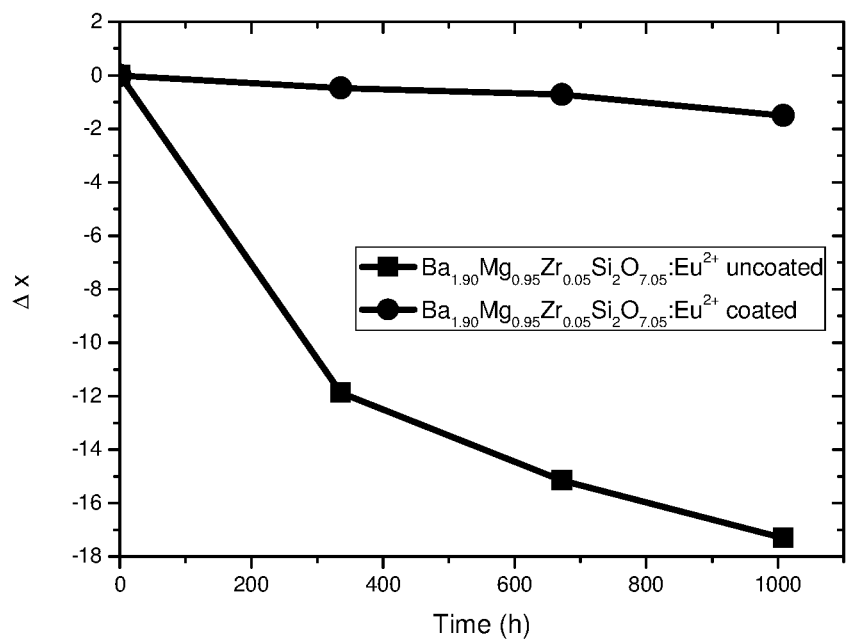
Figure 7:
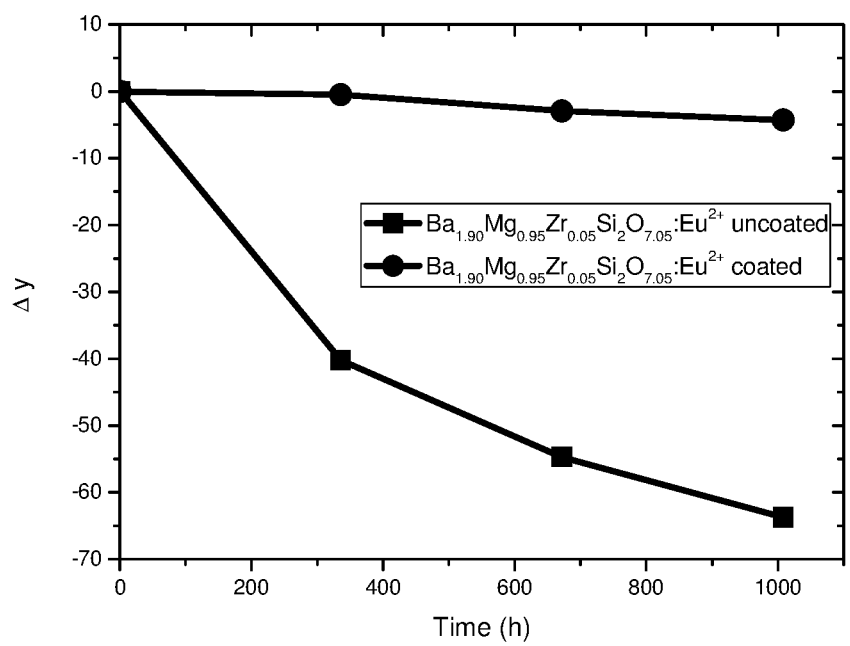

FIG. 7: Reliability comparison (CIE 1931 x co-ordinate drift) between the uncoated (Example 7) and alumina-coated (Example 10) pyrosilicate $Ba_{1.90}Mg_{0.95}Zr_{0.05}Si_2O_{7.05}:Eu^{2+}$ in an LED reliability test (in a standard 85° C./85% rel. humidity, storage time t=1000 h testing conditions with a 20 mA driving current):
a) CIE 1931 x coordinate drift over time;
b) CIE 1931 y coordinate drift over time.

The behavior of the LED with ALD treated phosphor remains almost unchanged. In contrast the LED built with untreated phosphor shows strong shift of color point during reliability testing.

Figure 8:
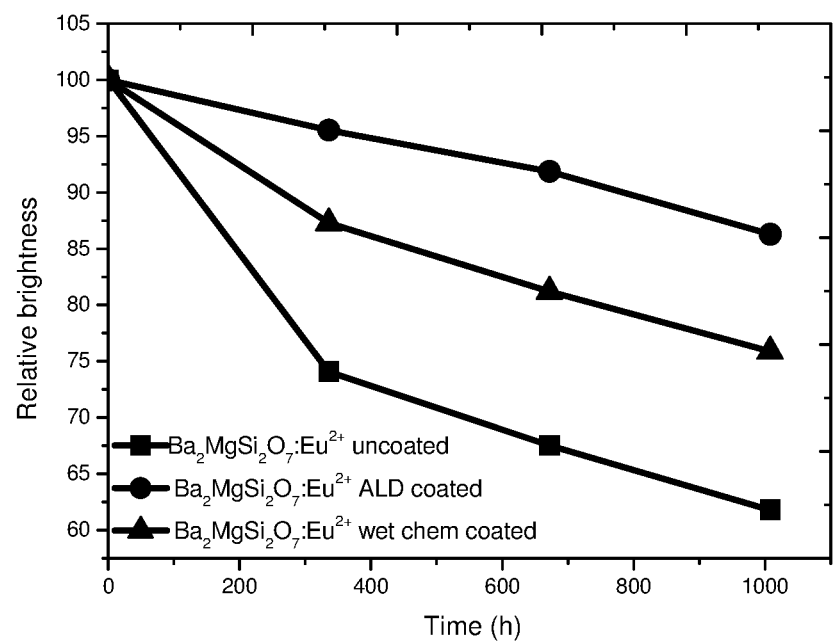

FIG. 8: Reliability comparison (brightness) between the uncoated (Example 1), wet chemical alumina—(Example 11) and alumina-coated (Example 10) pyrosilicate $Ba_{1.90}Eu_{0.10}MgSi_2O_7$ in an LED reliability test (in a standard 85° C./85% rel. humidity, storage time t=1000 h testing conditions with a 20 mA driving current).

Figure 9:
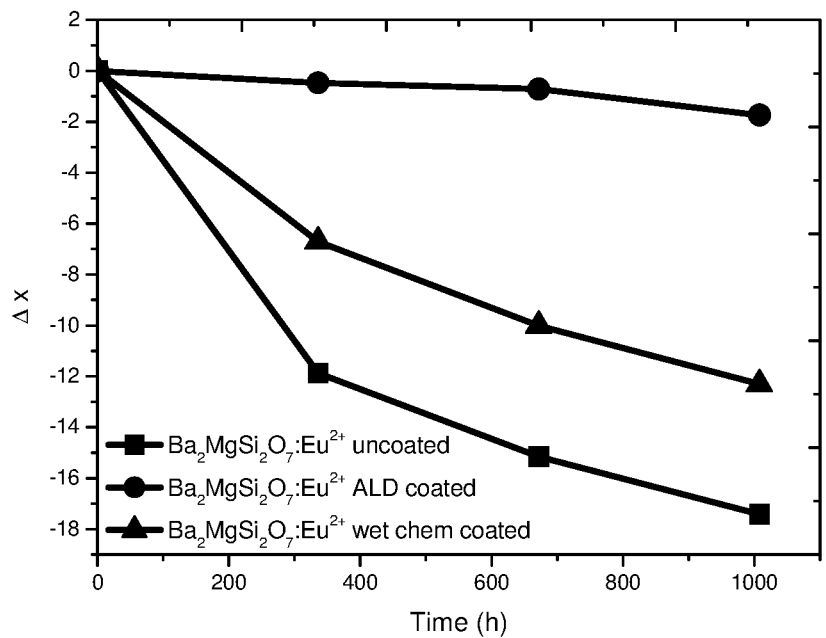
Figure 9:
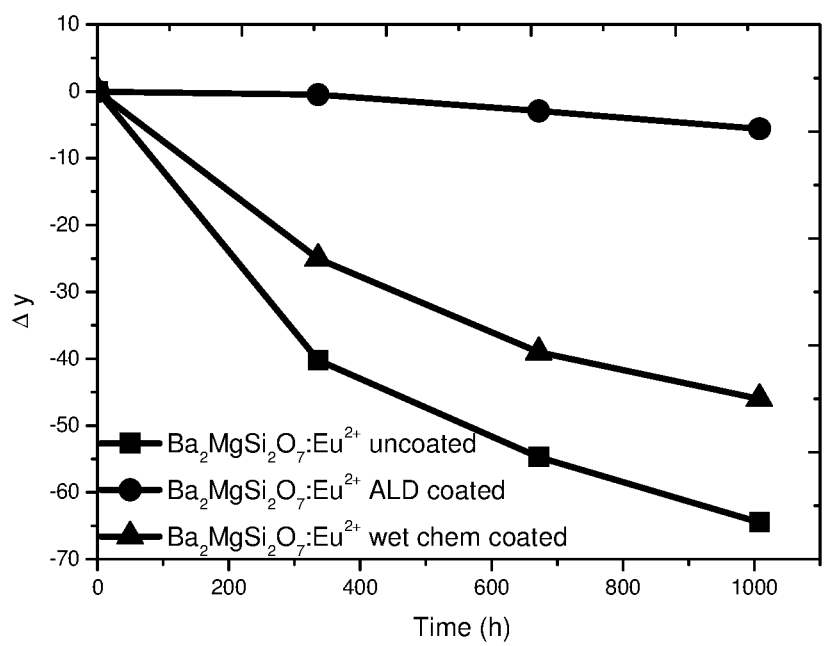

FIG. 9: Reliability comparison (CIE 1931 x co-ordinate drift) between the uncoated (Example 1), wet chemical alumina—(Example 11) and alumina-coated (Example 10) pyrosilicate $Ba_{1.90}Eu_{0.10}MgSi_2O_7$ in an LED reliability test (in a standard 85° C./85% rel. humidity, storage time t=1000 h testing conditions with a 20 mA driving current):
a) CIE 1931 x coordinate drift over time;
b) CIE 1931 y coordinate drift over time.

The invention claimed is:

1. A compound of formula (1), $$(Ba_{2-a-b-c-d}M_aA_bRE_cD_d)(Mg_{1-e-f-g-j}M'_eA'_fRE'_gC'_j)(Si_{2-h-i}B'_hC''_i)(O_{7+m-k-l}X_kN_l) \quad \text{Formula (1)}$$

where the following applies to the symbols and indices used:
M is Ca, Sr, Zn or a mixture of these elements;
A is Na, K, Rb or a mixture of these elements;
RE is La, Y, Gd or a mixture of these elements;
D is $Eu^{2+}$, $Mn^{2+}$, $Yb^{2+}$, $Sm^{2+}$ or a mixture of these elements;
M' is Zr, Hf or a mixture of these elements;
A' is Li, Na or a mixture of these elements;
RE' is Sc, Lu or a mixture of these elements;
C' is B, Al, Ga, In or a mixture of these elements;
B' is Ge, Sn or a mixture of these elements;
C" is B, Al, Ga, In or a mixture of these elements;
X is F, Cl or a mixture of these elements;
N is nitrogen;
$0 \leq a \leq 1.0$;
$0 \leq b \leq 0.6$;
$0 \leq c \leq 0.6$;
$0 < d \leq 2$;
$0 \leq e \leq 0.3$;
$0 \leq f \leq 0.3$;
$0 \leq g \leq 0.3$;
$0 \leq j \leq 0.6$;
$0 \leq h \leq 1.0$;
$0 \leq i \leq 0.6$;
$0 \leq k \leq 2.1$;
$0 \leq l \leq 2.1$;
$-2.0 \leq m \leq 2.0$;
wherein at least one and a maximum of three of the indices b, c, e, f, g, h, i, j, k, and l is $\neq 0$; and
wherein the compound contains a coating of aluminum oxide which has been deposited by an ALD process.

2. The compound according to claim 1, wherein the following applies for the indices used:
$0 \leq a \leq 0.4$;
$0 \leq b \leq 0.2$;
$0 \leq c \leq 0.2$;
$0.01 \leq d \leq 0.2$,
$0 \leq e \leq 0.1$;
$0 \leq f \leq 0.1$;
$0 \leq g \leq 0.1$;
$0 \leq j \leq 0.2$;
$0 \leq h \leq 0.4$;
$0 \leq i \leq 0.2$;
$0 \leq k \leq 0.7$;
$0 \leq l \leq 0.7$;
$-0.5 \leq m \leq 0.5$.

3. The compound according to claim 1, wherein said compound is selected from compounds of formula (2), $$(Ba_{2-a-b-c-d}M_aK_bLa_cEu_d)(Mg_{1-e-f-g-j}Zr_eLi_fSc_gC'_j)(Si_{2-h-i}Ge_hC'_i)(O_{7+m-k-l}X_kN_l) \quad \text{Formula (2)}$$

where the following applies for the symbols and indices used:
M is Ca, Sr or a mixture of these elements;
C' is Al, Ga or a mixture of these elements;
C" is Al, Ga or a mixture of these elements;
X is F, Cl or a mixture of these elements;
N is nitrogen;
$0 \leq a \leq 0.4$;
$0 \leq b \leq 0.2$;
$0 \leq c \leq 0.2$;
$0 \leq d \leq 0.4$,
$0 \leq e \leq 0.1$;
$0 \leq f \leq 0.1$;
$0 \leq g \leq 0.1$;
$0 \leq j \leq 0.2$;
$0 \leq h \leq 0.4$;
$0 \leq i \leq 0.2$;
$0 \leq k \leq 0.7$;
$0 \leq l \leq 0.7$;
$-0.5 \leq m \leq 0.5$.

4. The compound according to claim 3, wherein the index d satisfies the following equation: $0.01 \leq d \leq 0.2$.

5. The compound according to claim 1, wherein said compound is selected from compounds of the following formulae:

$$(Ba_{2-b-d}A_bD_d)Mg\,Si_2(O_{7-b}X_b) \quad (3)$$

$$(Ba_{2-b-d}A_bD_d)(Mg_{1-b}RE'_b)Si_2O_7 \quad (4)$$

$$(Ba_{2-b-d}A_bD_d)Mg\,Si_2O_{7-0.5b} \quad (5)$$

$$(Ba_{2-c-d}RE_cD_d)Mg\,Si_2(O_{7-c}N_c) \quad (6)$$

$$(Ba_{2-d}D_d)(Mg_{1-g}RE'_g)Si_2(O_{7-g}N_g) \quad (7)$$

$$(Ba_{2-d}D_d)(Mg_{1-e}M'_e)Si_2O_{7+e} \quad (8)$$

$$(Ba_{2-d-0.5e}D_d)(Mg_{1-e}M'_e)Si_2O_{7+0.5e} \quad (9)$$

$$(Ba_{2-d}D_d)(Mg_{1-f}A'_f)Si_2(O_{7-f}X_f) \quad (10)$$

$$(Ba_{2-d}D_d)(Mg_{1-2f}A'_fC'_f)Si_2O_7 \quad (11)$$

$$(Ba_{2-d}D_d)(Mg_{1-f}A'_f)(Si_{2-f}C''_f)O_7 \quad (12)$$

$$(Ba_{2-d}D_d)(Mg_{1-2e}M'_eRE'_e)Si_2(O_{7-e}N_e) \quad (13)$$

$$(Ba_{2-a-d}M_aD_d)Mg\,Si_2O_7 \quad (15)$$

$$(Ba_{2-d}D_d)Mg(Si_{2-h}B'_h)O_7 \quad (16)$$

$$(Ba_{2-d}D_d)(Mg_{1-j}C'_j)(Si_{2-j}C''_j)O_7 \quad (17)$$

where the symbols and indices have the meanings given above and furthermore:
$b \neq 0$ in formula (3), (4) and (5),
$c \neq 0$ in formula (6),
$g \neq 0$ in formula (7),
$e \neq 0$ in formula (8) and (9),
$f \neq 0$ in formula (10), (11) and (12), and
$e \neq 0$ in formula (13).

6. The compound according to claim 1, selected from the compounds of the following formulae:

$$(Ba_{2-b-d}K_bEu_d)Mg\,Si_2(O_{7-b}F_b) \quad (3a)$$

$$(Ba_{2-b-d}K_bEu_d)Mg\,Si_2(O_{7-b}Cl_b) \quad (3b)$$

$$(Ba_{2-b-d}K_bEu_d)(Mg_{1-b}Sc_b)Si_2O_7 \quad (4a)$$

$$(Ba_{2-b-d}K_bEu_d)Mg\,Si_2O_{7-0.5b} \quad (5a)$$

$(Ba_{2-c-d}La_cEu_d)Mg\,Si_2(O_{7-c}N_c)$ (6a)

$(Ba_{2-d}Eu_d)(Mg_{1-g}Sc_g)Si_2(O_{7-g}N_g)$ (7a)

$(Ba_{2-d}Eu_d)(Mg_{1-e}Zr_e)Si_2O_{7+e}$ (8a)

$(Ba_{2-d-0.5e}Eu_d)(Mg_{1-e}Zr'_e)Si_2O_{7+0.5e}$ (9a)

$(Ba_{2-d}Eu_d)(Mg_{1-f}Li_f)Si_2(O_{7-f}F_f)$ (10a)

$(Ba_{2-d}Eu_d)(Mg_{1-f}Li_f)Si_2(O_{7-f}Cl_f)$ (10b)

$(Ba_{2-d}Eu_d)(Mg_{1-2f}Li_fAl_f)Si_2O_7$ (11a)

$(Ba_{2-d}Eu_d)(Mg_{1-2f}Li_fGa_f)Si_2O_7$ (11b)

$(Ba_{2-d}Eu_d)(Mg_{1-f}Li_f)(Si_{2-f}Al_f)O_7$ (12a)

$(Ba_{2-d}Eu_d)(Mg_{1-f}Li_f)(Si_{2-f}Ga_f)O_7$ (12b)

$(Ba_{2-d}Eu_d)(Mg_{1-2e}Zr_eSc_e)Si_2(O_{7-e}N_e)$ (13a)

$(Ba_{1-a-d}Sr_aEu_d)_2Mg\,Si_2O_7$ (15a)

$(Ba_{1-a-d}Ca_aEu_d)_2Mg\,Si_2O_7$ (15b)

$(Ba_{1-d}Eu_d)_2Mg(Si_{1-h}Ge_h)_2O_7$ (16a)

$(Ba_{2-d}Eu_d)(Mg_{1-j}Al_j)(Si_{2-j}Al_j)O_7$ (17a)

where the symbols and indices have the meanings given above and furthermore:
b≠0 in formula (3a), (3b), (4a) and (5a),
c≠0 in formula (6a),
g≠0 in formula (7a),
e≠0 in formula (8a) and (9a),
f≠0 in formula (10a), (10b), (11a), (11 b), (12a) and (12b), and
e≠0 in formula (13a).

7. The compound according to claim 1, wherein said compound is selected from the following compounds:
$Ba_{1.85}K_{0.05}Eu_{0.10}MgSi_2O_{6.95}Cl_{0.05}$,
$Ba_{1.85}K_{0.05}Eu_{0.10}MgSi_2O_{6.95}F_{0.05}$,
$Ba_{1.90}Eu_{0.10}Mg_{0.95}Li_{0.05}Si_2O_{6.95}Cl_{0.05}$,
$Ba_{1.90}Eu_{0.10}Mg_{0.95}Li_{0.05}Si_2O_{6.95}F_{0.05}$,
$Ba_{1.90}Eu_{0.10}Mg_{0.80}Li_{0.1}Al_{0.1}Si_2O_7$,
$Ba_{1.90}Eu_{0.10}Mg_{0.95}Zr_{0.05}Si_2O_{7.05}$,
$Ba_{1.90}Eu_{0.10}Mg_{0.95}Sc_{0.05}Si_2O_{7.025}$, and
$Ba_{1.86}Eu_{0.10}La_{0.04}MgSi_2O_{7.02}$.

8. The compound according to claim 1, wherein a maximum of two of the indices b, c, e, f, g, h, i, j, k, and l is ≠0.

9. The compound Previously Presented according to claim 1, wherein the coating has a thickness between 0.5 and 150 nm.

10. The compound according to claim 9, wherein the coating has a thickness between 2 and 75 nm.

11. The compound according to claim 10, wherein the coating has a thickness between 3 and 50 nm.

12. A method for preparation of a phosphor according to claim 1, comprising:
a) providing a compound of formula (1); and
b) forming a layer of aluminum oxide on the surface of the compound via an atomic layer deposition process.

13. The method according to claim 12, wherein the formation of the layer of aluminum oxide comprises:
b1) introducing a purge/fluidizing gas;
b2) introducing a mixture of carrier gas and first reagent;
b3) introducing a purge/fluidizing gas and/or pulling a vacuum to remove excess quantities of the first reagent and reaction by-products;
b4) introducing a mixture of carrier gas and second reagent;
b5) introducing a purge/fluidizing gas and/or pulling a vacuum to remove excess quantities of the second reagent and reaction by-products; and
b6) repeating b2) to b5) until desired coating thickness is obtained.

14. The method according to claim 13, wherein argon, nitrogen, other inert gas, or a mixture of inert gases is used as the purge/fluidizing gas and argon, nitrogen, other inert gas, or a mixture of inert gases is used as carrier gas.

15. The method according to claim 13, wherein trialkyl aluminum or an aluminum trihalide are used as the first reagent and an oxidizer is used as the second reagent.

16. The method according to claim 13, wherein trimethyl aluminum, triethyl aluminum, or aluminum trichloride are used as the first reagent and an oxidizer selected from water, oxygen plasma species, ozone or alcohols is used as the second reagent.

17. A method comprising partial or complete conversion of near-UV emission or violet emission of a light-emitting diode into light having a longer wavelength by a conversion phosphor comprising a compound according to claim 1.

18. A light source comprising at least one primary light source and at least one compound according to claim 1.

19. The light source according to claim 18, wherein the primary light source is a luminescent indium aluminum gallium nitride, or a luminescent arrangement based on ZnO, transparent conducting oxide or SiC, or a near-UV or violet laser, or a source which exhibits electroluminescence and/or photoluminescence, or a plasma or discharge source.

20. A lighting comprising at least one light source according to claim 18.

* * * * *